United States Patent
Tomeba et al.

(10) Patent No.: US 11,968,141 B2
(45) Date of Patent: Apr. 23, 2024

(54) BASE STATION APPARATUS, TERMINAL APPARATUS, AND COMMUNICATION METHOD

(71) Applicant: SHARP KABUSHIKI KAISHA, Sakai (JP)

(72) Inventors: Hiromichi Tomeba, Sakai (JP); Ryota Yamada, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 558 days.

(21) Appl. No.: 17/275,001

(22) PCT Filed: Sep. 6, 2019

(86) PCT No.: PCT/JP2019/035161
§ 371 (c)(1),
(2) Date: Mar. 10, 2021

(87) PCT Pub. No.: WO2020/054606
PCT Pub. Date: Mar. 19, 2020

(65) Prior Publication Data
US 2022/0060297 A1    Feb. 24, 2022

(30) Foreign Application Priority Data

Sep. 14, 2018   (JP) ................. 2018-172520

(51) Int. Cl.
*H04L 5/00*         (2006.01)
*H04B 7/0417*       (2017.01)
(52) U.S. Cl.
CPC ......... *H04L 5/0048* (2013.01); *H04B 7/0417* (2013.01)
(58) Field of Classification Search
None
See application file for complete search history.

(56) References Cited

U.S. PATENT DOCUMENTS 10,298,300 B2 *   5/2019   Rahman ................. H04L 1/0023
11,012,857 B1 *   5/2021   Malhotra ................ H04W 8/08
(Continued)

FOREIGN PATENT DOCUMENTS

WO      2017/090987 A1    6/2017

OTHER PUBLICATIONS

International Telecommunication Union, "IMT Vision-Framework and overall objectives of the future development of IMT for 2020 and beyond", Recommendation ITU-R M.2083-0, Sep. 2015, M Series Mobile, radiodetermination, amateur and related satellite services.

(Continued)

*Primary Examiner* — Hassan A Phillips
*Assistant Examiner* — Gautam Sharma
(74) *Attorney, Agent, or Firm* — ScienBiziP, P.C.

(57) ABSTRACT

To provide a base station apparatus, a terminal apparatus, and a communication method capable of improving a frequency efficiency or throughput by suppressing an overhead associated with feedback from the terminal apparatus in a case that the base station apparatus acquires highly accurate CSI. A terminal apparatus according to an aspect of the present invention includes a receiver configured to receive at least one NZP CSI-RS, and a transmitter configured to transmit a signal including at least one piece of CSI. The at least one piece of CSI includes at least an RI and a PMI, the receiver acquires a first value for configuring the number of vectors indicated by the PMI, and in a case that a value of the RI exceeds a prescribed value, the number of vectors is configured by a second value being a value equal to or less than the first value.

4 Claims, 5 Drawing Sheets

(56) References Cited

U.S. PATENT DOCUMENTS

| | | | | |
|---|---|---|---|---|
| 2011/0080972 A1* | 4/2011 | Xi | .................. | H04L 1/0625 |
| | | | | 375/267 |
| 2011/0142147 A1* | 6/2011 | Chen | ................ | H04L 25/03343 |
| | | | | 375/260 |
| 2013/0094464 A1* | 4/2013 | Li | .................. | H04L 5/0053 |
| | | | | 370/329 |
| 2013/0182671 A1* | 7/2013 | Kakishima | ........... | H04B 7/0404 |
| | | | | 370/329 |
| 2013/0336214 A1* | 12/2013 | Sayana | ................ | H04L 5/0048 |
| | | | | 370/328 |
| 2014/0133317 A1* | 5/2014 | Chen | ................... | H04B 7/0671 |
| | | | | 370/252 |
| 2015/0146634 A1* | 5/2015 | Hwang | ................ | H04L 1/0057 |
| | | | | 370/329 |
| 2015/0172024 A1* | 6/2015 | Kim | ..................... | H04L 5/0057 |
| | | | | 370/329 |
| 2016/0014681 A1* | 1/2016 | Yi | ........................ | H04W 48/16 |
| | | | | 455/422.1 |
| 2016/0294454 A1* | 10/2016 | Onggosanusi | ......... | H04B 7/065 |
| 2016/0380734 A1* | 12/2016 | Wang | .................. | H04L 5/0048 |
| | | | | 370/329 |
| 2018/0192414 A1* | 7/2018 | Takahashi | ............. | H04W 72/21 |
| 2018/0343046 A1 | 11/2018 | Park et al. | | |
| 2019/0013855 A1* | 1/2019 | Kim | .................... | H04B 7/0639 |
| 2019/0173549 A1* | 6/2019 | Liang | ................... | H04B 7/0658 |
| 2021/0028843 A1* | 1/2021 | Zhou | ...................... | H04B 7/063 |
| 2022/0060297 A1* | 2/2022 | Tomeba | ................ | H04B 7/063 |

OTHER PUBLICATIONS

Samsung, "WI Proposal on NR MIMO Enhancements", RP-181453, 3GPP TSG RAN Meeting #80, La Jolla, USA, Jun. 11-14, 2018.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method. This application claims priority based on JP 2018-172520 filed on Sep. 14, 2018, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International mobile telecommunication-2020 and beyond: IMT-2020) was recently reported (see NPL 1) by the International Telecommunication Union Radio communications Sector (ITU-R), which is an international standardization body.

An important problem is to secure a frequency resource for the communication system to cope with a rapid increase in data traffic. As such, one of targets in the 5G is to achieve ultra-high capacity communications using higher frequency bands than the frequency bands used in Long term evolution (LTE).

In improving throughput, it is important to utilize spatial resources. Even in the 5G system, a Multiple-input Multiple-output (MIMO) technology in which multiple antennas are used for transmission and reception has been expected to be utilized (see NPL 2). Further, in a case that a base station apparatus is capable of recognizing Channel state information (CSI) between the base station apparatus and a terminal apparatus, the efficiency of the MIMO technology is further enhanced.

As a method for acquiring CSI by the base station apparatus, it is conceivable to feed back the CSI measured by the terminal apparatus to the base station apparatus. For example, the base station apparatus and the terminal apparatus share in advance a codebook including multiple vectors indicating the channel state, and the terminal apparatus selects from the codebook the vector closest to the CSI measured by the terminal apparatus to feed back the selected vector to the base station apparatus, thereby allowing the base station apparatus to recognize the channel state. In this case, the accuracy of the CSI that the base station apparatus can recognize depends on the accuracy of the codebook, and in simple consideration, the accuracy of the CSI increases in proportion to the number of vectors described in the codebook.

CITATION LIST

Non Patent Literature

NPL 1: "IMT Vision—Framework and overall objectives of the future development of IMT for 2020 and beyond," Reconnnendation ITU-R M. 2083-0, September 2015.
NPL 2: 3 GPP RP-181453, "Enhancement on MIMO for NR," June 2018.

SUMMARY OF INVENTION

Technical Problem

As described above, the accuracy of the CSI the base station apparatus can acquire depends greatly on the accuracy of the codebook referenced by the terminal apparatus. However, this means that, in order for the base station apparatus to acquire highly accurate CSI, the overhead associated with feedback from the terminal apparatus increases. In addition, while the propagation environment changes from time to time due to the movement of the terminal apparatus and the changes in the surrounding environment, an increase in latency due to feedback causes a problem in that the CSI acquired by the base station apparatus is unable to follow the change in the propagation environment.

An aspect of the present invention has been made in view of such circumstances, and an object thereof is to provide a base station apparatus, a terminal apparatus, and a communication method capable of improving the frequency efficiency or throughput by suppressing the overhead associated with feedback from the terminal apparatus in a case that the base station apparatus acquires the highly accurate CSI.

Solution to Problem

A base station apparatus, a terminal apparatus, and a communication method according to an aspect of the present invention in order to solve the above problems are configured as follows.

(1) Specifically, a terminal apparatus according to an aspect of the present invention is a terminal apparatus for communicating with a base station apparatus, the terminal apparatus including: a receiver configured to receive at least one NZP CSI-RS; and a transmitter configured to transmit a signal including at least one piece of CSI, wherein the at least one piece of CSI includes at least an RI and a PMI, the receiver acquires a first value for configuring the number of vectors indicated by the PMI, and in a case that a value of the RI exceeds a prescribed value, the number of vectors is configured by a second value being a value equal to or less than the first value.

(2) The terminal apparatus according to an aspect of the present invention is described in (1) above, wherein the receiver receives RI restriction information that limits a candidate of the RI, and the number of vectors specified by the PMI is configured based on the RI restriction information.

(3) The terminal apparatus according to an aspect of the present invention is described in (1) above, wherein the PMI further includes a PMI 14 specifying an amplitude coefficient, and in the case that the value of the RI exceeds the prescribed value, the number of candidates of the amplitude coefficient is less than the number of candidates in a case that the value of the RI is equal to or less than the prescribed value.

(4) The terminal apparatus according to an aspect of the present invention is described in (1) above, wherein the PMI further includes a PMI 21 indicating a phase coefficient, and the receiver receives a bitmap that limits a candidate of the phase coefficient.

(5) The terminal apparatus according to an aspect of the present invention is described in (1) above, wherein the receiver receives DCI including trigger information requesting the CSI, and the DCI includes information indicating an element included in the CSI.

(6) A base station apparatus according to an aspect of the present invention is a base station apparatus for communicating with a terminal apparatus, the base station apparatus including a receiver configured to transmit at least one NZP CSI-RS, and a receiver configured to transmit a signal including at least one piece of CSI, wherein the at least one piece of CSI includes at least an RI and a PMI, the transmitter transmits a signal including a first value for configuring the number of vectors indicated by the PMI, and in a case that a value of the RI exceeds a prescribed value, the number of vectors is interpreted as being indicated by a second value being a value equal to or less than the first value.

(7) A communication method according to an aspect of the present invention is a communication method for a terminal apparatus for communicating with a base station apparatus, the communication method including the steps of receiving at least one NZP CSI-RS, transmitting a signal including CSI, the CSI including at least an RI and a PMI, acquiring a first value for configuring the number of vectors indicated by the PMI, and configuring the number of vectors by a second value in a case that a value of the RI exceeds a prescribed value, the second value being a value equal to or less than the first value.

Advantageous Effects of Invention

According to an aspect of the present invention, it is possible to suppress the overhead associated with feedback from the terminal apparatus in a case that the base station apparatus acquires the highly accurate CSI, and thus, the frequency efficiency or throughput can be improved.

DESCRIPTION OF EMBODIMENTS

A communication system according to the present embodiment includes a base station apparatus (a transmitting apparatus, cells, a transmission point, a group of transmit antennas, a group of transmit antenna ports, component carriers, eNodeB, a transmission point, a transmission reception point, a transmission panel, and an access point and terminal apparatuses (a terminal, a mobile terminal, a reception point, a reception terminal, a receiving apparatus, a group of receive antennas, a group of receive antenna ports, UE, a reception point, a reception panel, and a station). Furthermore, a base station apparatus connected to a terminal apparatus (base station apparatus that establishes a radio link with a terminal apparatus) is referred to as a serving cell.

The base station apparatus and the terminal apparatus according to the present embodiment are collectively referred to as communication apparatuses. At least part of the communication method performed by the base station apparatus in the present embodiment can also be performed by the terminal apparatus. Similarly, at least part of the communication method performed by the terminal apparatus in the present embodiment can also be performed by the base station apparatus.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

1. First Embodiment

Figure 1:
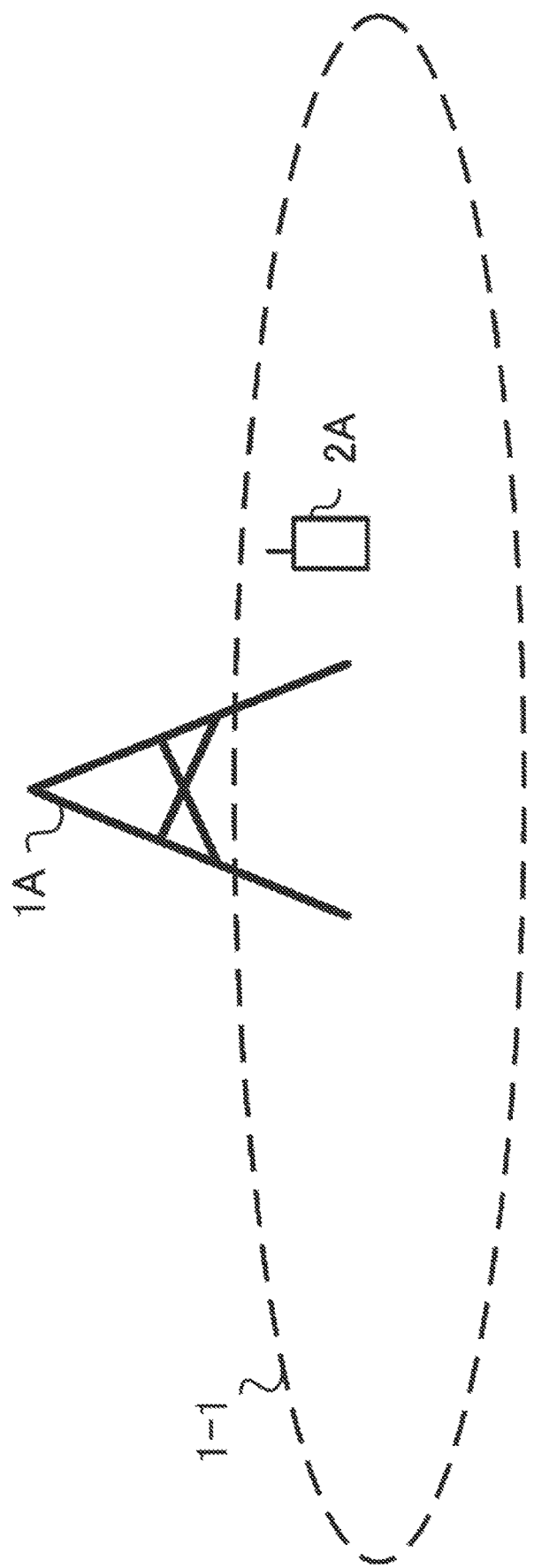
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatus 2A. A coverage 1-1 is a range (a communication area) in which the base station apparatus 1A can connect to the terminal apparatuses. The base station apparatus 1A is also simply referred to as a base station apparatus. The terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes a positive acknowledgement (ACK) or a negative acknowledgement (NACK) (ACK/NACK) in response to downlink data (a downlink transport block or a Downlink-Shared Channel (DL-SCH)). ACK/NACK in response to the downlink data is also referred to as HARQ-ACK or HARQ feedback.

Here, the uplink control information includes Channel State Information (CSI) for the downlink. The uplink control information includes a Scheduling Request (SR) used to request an Uplink-Shared Channel (UL-SCH) resource. The channel state information refers to a Rank Indicator (RI) for indicating a preferable spatial multiplexing number, a Precoding Matrix Indicator (PMI) for indicating a preferable precoder, a Channel Quality Indicator (CQI) for indicating a preferable transmission rate, a CSI-Reference Signal (RS) Resource Indicator (CRI) for indicating a preferable CSI-RS resource, a Reference Signal Received Power (RSRP) measured by a CSI-RS or a Synchronization Signal (SS), and the like.

The channel quality indicator (hereinafter, referred to as a CQI value) can be a preferable modulation scheme (e.g., QPSK, 16QAM, 64QAM, 256QAM, or the like) and a preferable coding rate in a prescribed band (details of which will be described later). The CQI value can be an index (CQI Index) determined by the above change scheme, coding rate, and the like. The CQI value can take a value predetermined in the system.

The CRI indicates a CSI-RS resource of which received power/reception quality is preferable from multiple CSI-RS resources.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that some or all of the CQI value, the PMI value, the RI value, and the CRI value are also collectively referred to as CSI values.

PUSCH is used for transmission of uplink data (an uplink transport block, UL-SCH). Furthermore, PUSCH may be used for transmission of ACK/NACK and/or channel state information along with the uplink data. In addition, PUSCH may be used to transmit the uplink control information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. Here, the uplink reference signal includes a Demodulation Reference Signal (DMRS), a Sounding Reference Signal (SRS), a Phase-Tracking reference signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. Moreover, the SRS is used for uplink observation (sounding). The PT-RS is used to compensate for phase noises. Note that the DMRS of uplink is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

The PBCH is used for broadcasting a Master Information Block (MIB, a Broadcast Channel (BCH)) that is used commonly by the terminal apparatuses. PCFICH is used for transmission of information for indicating a region (e.g., the number of Orthogonal Frequency Division Multiplexing (OFDM) symbols) to be used for transmission of PDCCH. Note that the MIB is also referred to as minimum system information.

PHICH is used for transmission of ACK/NACK in response to uplink data (a transport block, a codeword) received by the base station apparatus 1A. In other words, PHICH is used for transmission of a HARQ indicator (HARQ feedback) for indicating ACK/NACK in response to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that PHICH in response to uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

Furthermore, the DCI format for the uplink can be used to request Channel State Information (CSI; also referred to as reception quality information) for the downlink (CSI request).

The DCI format for the uplink can be used for a configuration for indicating an uplink resource to which a CSI feedback report is mapped, the CSI feedback report being fed back to the base station apparatus by the terminal apparatus. For example, the CSI feedback report can be used for a configuration for indicating an uplink resource that periodically reports channel state information (Periodic CSI). The CSI feedback report can be used for a mode configuration (CSI report mode) for periodically reporting the channel state information.

For example, the CSI feedback report can be used for a configuration for indicating an uplink resource that reports aperiodic channel state information (Aperiodic CSI). The CSI feedback report can be used for a mode configuration (CSI report mode) for aperiodically reporting the channel state information.

For example, the CSI feedback report can be used for a configuration for indicating an uplink resource that reports semi-persistent CSI. The CSI feedback report can be used for a mode configuration (CSI report mode) for semi-persistently reporting the channel state information. Note that the semi-persistent CSI report is periodically CSI reporting in a periodicity from activation through higher layer signaling or downlink control information to deactivation.

The DCI format for the uplink can be used for a configuration for indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information on the scheduled PUSCH.

The PDSCH is used to transmit the downlink data (the downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus TA may be a dedicated message (also referred to as dedicated signaling) to a certain terminal apparatus 2A. In other words, user equipment specific (user equipment unique) information is transmitted by using the message dedicated to the certain terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration for indicating an uplink resource that periodically reports channel state information (Periodic CSI). The CSI feedback report can be used for a mode configuration (CSI report mode) for periodically reporting the channel state information.

The type of the downlink Channel State Information report includes wideband CSI (e.g., Wideband CSI) and narrowband CSI (e.g., Subband CSJ). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that the synchronization signal includes a primary synchronization signal (PSS) and a secondary synchronization signal (SSS).

The synchronization signal is used for the terminal apparatus to establish synchronization in the frequency domain and the time domain in the downlink. The synchronization signal is also used to measure a received power, a reception quality, or a Signal-to-Interference and Noise power Ratio (SINR). Note that the received power measured using the synchronization signal is also referred to as a Synchronization Signal-Reference Signal Received Power (SS-RSRP), the reception quality measured by the synchronization signal is also referred to as a SS-reference signal received quality (RSRQ), and the SINR measured by the synchronization signal is also referred to as a SS-SINR. Note that the SS-RSRQ is a ratio between the SS-RSRP and the RSSI. The Received Signal Strength Indicator (RSSI) is an average of total received power for a certain observation periodicity. The synchronization signal/downlink reference signal is used for the terminal apparatus to perform channel compensation on a downlink physical channel. For example, the synchronization signal/downlink reference signal is used for the terminal apparatus to calculate the downlink channel state information.

Here, the downlink reference signals include a Demodulation Reference Signal (DMRS), a Non-Zero Power Channel State Information-Reference Signal (NZP CSI-RS), a Zero Power Channel State Information-Reference Signal (ZP CSI-RS), a PT-RS, and a Tracking Reference Signal (TRS). Note that the DMRS of downlink is also referred to as a downlink DMRS. Note that in the following embodiments, the CSI-RS simply referred to includes the NZP CSI-RS and/or the ZP CSI-RS.

The DMRS is transmitted in a subframe and a band that are used for transmission of the PDSCH/PBCH/PDCCH/EPDCCH to which the DMRS relates, and is used to demodulate the PDSCH/PBCH/PDCCH/EPDCCH to which the DMRS relates.

A resource for NZP CSI-RS is configured by the base station apparatus 1A. For example, the terminal apparatus 2A performs signal measurement (channel measurement) or interference measurement by using the NZP CSI-RS. The NZP CSI-RS is also used for beam sweeping for seeking a preferable beam direction, beam recovery for recovering in a case that the received power/reception quality in the beam direction deteriorates, or the like. A resource for ZP CSI-RS is configured by the base station apparatus 1A. With zero output, the base station apparatus 1A transmits a ZP CSI-RS. The terminal apparatus 2A measures an interference in a resource to which the ZP CSI-RS corresponds, for example. Note that the resource to which the ZP CSI-RS corresponds and in which the interference is measured is also referred to as a CSI-Interference Measurement (IM) resource.

The base station apparatus 1A transmits (configures) an NZP CSI-RS resource configuration for the resource for the NZP CSI-RS. The NZP CSI-RS resource configuration includes some or all of mapping of one or multiple NZP CSI-RS resources, a CSI-RS resource configuration ID for each NZP CSI-RS resource, and the number of antenna ports. The CSI-RS resource mapping may be information indicating an OFDM symbol and a subcarrier (e.g., a resource element) in a slot in which the CSI-RS resource is allocated. The CSI-RS resource configuration ID is used to identify the NZP CSI-RS resource.

The base station apparatus 1A transmits (configures) a CSI-IM resource configuration. The CSI-IM resource configuration includes mapping of one or multiple CSI-IM resources, and a CSI-IM resource configuration ID for each CSI-IM resource. The CSI-IM resource mapping is information indicating an OFDM symbol and a subcarrier (e.g., a resource element) in a slot in which the CSI-IM resource is allocated. The CSI-IM resource configuration ID is used to identify the CSI-IM configuration resource.

The CSI-RS is also used to measure the received power, the reception quality, or the SINR. The received power measured by the CSI-RS is also referred to as a CSI-RSRP, the reception quality measured by the CSI-RS is also referred to as a CSI-RSRQ, and the SINR measured by the CSI-RS is also referred to as a CSI-SINR. Note that the CSI-RSRQ is a ratio between the CSI-RSRP and the RSSI.

The CSI-RS is also transmitted periodically/aperiodically/semi-persistently.

With respect to CSI, the terminal apparatus is configured through a higher layer. For example, there is a reporting configuration that is a configuration of a CSI report, a resource configuration that is a configuration of a resource for measuring CSI, and a measurement link configuration linking a reporting configuration and a resource configuration for the CSI measurement. Additionally, one or multiple reporting configurations, resource configurations, and measurement link configurations are configured.

The reporting configuration includes some or all of a reporting configuration ID, a reporting configuration type, a codebook configuration, a CSI report amount, a CQI table, group-based beam reporting, the number of CQIs per report, and the number of CQIs per report in a low rank. The reporting configuration ID is used to identify the reporting configuration. The reporting configuration type indicates a periodic/aperiodic/semi-persistent CSI report. The CSI report amount indicates an amount of report (value, type), the examples of which include some or all of the CRI, RI, PMI, CQI, and RSRP. The CQI table indicates a CQI table for computing the CQI. The group-based beam reporting is configured with ON/OFF (valid/invalid). The number of CQIs per report indicates the maximum number of CSIs per CSI report. The maximum number of CQIs per report is indicated in a case that the RI is 4 or less. Note that the number of CQIs per report in a low rank may be applied in a case that the number of CQIs per report is 2. The codebook configuration includes a codebook type and a configuration of the codebook. The codebook type indicates a type 1 codebook or a type 2 codebook. The codebook configuration also includes a configuration of the type 1 codebook or type 2 codebook.

The resource configuration includes some or all of the resource configuration ID, a synchronization signal block resource measurement list, a resource configuration type, and a configuration of a set of one or multiple resources. The resource configuration ID is used to identify the resource configuration. The synchronization signal block resource configuration list is a list of resources for which measurements are performed using synchronization signals. The resource configuration type indicates whether the CSI-RS is transmitted periodically, aperiodically, or semi-persistently. Note that in a case of the configuration in which the CSI-RS is transmitted semi-persistently, the CSI-RS is periodically transmitted during a periodicity from activation through the higher layer signaling or downlink control information to deactivation.

The resource set configuration includes some or all of a resource set configuration ID, resource repetition, or information indicating one and multiple CSI-RS resources. The resource set configuration ID is used to identify the resource set configuration. The resource repetition indicates ON/OFF of the resource repetition in the resource set. A case that the resource repetition is ON means that the base station apparatus uses a transmit beam that is fixed (identical) on each of the multiple CSI-RS resources in the resource set. In other words, in the case that the resource repetition is ON, the terminal apparatus assumes that the base station apparatus is using a transmit beam that is fixed (identical) on each of the multiple CSI-RS resources in the resource set. A case that the resource repetition is OFF means that the base station apparatus does not use a transmit beam fixed (identical) on each of the multiple CSI-RS resources in the resource set. In other words, in the case that the resource repetition is OFF, the terminal apparatus assumes that the base station apparatus does not use a transmit beam fixed (identical) on each of the multiple CSI-RS resources in the resource set. The information indicating the CSI-RS resource includes one or multiple CSI-RS resource configuration IDs, and one or multiple CSI-IM resource configuration IDs.

The measurement link configuration includes some or all of the measurement link configuration ID, the reporting configuration ID, and the resource configuration ID, and the reporting configuration and the resource configuration are linked. The measurement link configuration ID is used to identify the measurement link configuration.

A Multimedia Broadcast multicast service Single Frequency Network (MBSFN) RS is transmitted in an entire band of the subframe used for transmitting PMCH. MBSFN RS is used to demodulate PMCH. PMCH is transmitted through the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Furthermore, for terminal apparatuses that supports Carrier Aggregation (CA), the base station apparatus can integrate multiple Component Carriers (CCs) for transmission in a broader band to perform communication. In carrier aggregation, one Primary Cell (PCell) and one or multiple Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or multiple SCells. Furthermore, SCG includes a primary SCell (PSCell) and optionally one or multiple SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

A slot includes 14 OFDM symbols. Since an OFDM symbol length can vary depending on a subcarrier spacing, a slot length can vary depending on a subcarrier spacing. A mini-slot includes OFDM symbols the number of which is smaller than the slot. The slot/mini-slot can be in scheduling units. Note that the terminal apparatus can recognize a slot-based scheduling/mini-slot-based scheduling according to a position (allocation) of the first downlink DMRS. In the slot-based scheduling, the first downlink DMRS is allocated to the third or fourth symbols of the slot. In the mini-slot-based scheduling, the first downlink DMRS is allocated to the first symbol of the scheduled data (resource, PDSCH).

A resource block is defined as 12 contiguous subcarriers. The resource element is defined by an index of the frequency domain (e.g., a subcarrier index) and an index of the time domain (e.g., an OFDM symbol index). The resource element is classified into an uplink resource element, a downlink element, a flexible resource element, and a reserved resource element. In the reserved resource element, the terminal apparatus does not transmit the uplink signal and does not receive the downlink signal.

Multiple subcarrier spacings (SCS) are supported. For example, the SCS is 15/30/60/120/240/480 kHz.

The base station apparatus/terminal apparatus can communicate in a licensed band or an unlicensed band. The base station apparatus/terminal apparatus can communicate with at least one SCell operating in the unlicensed band by way of carrier aggregation in which the licensed band operates as a PCell. In addition, the base station apparatus/terminal apparatus can communicate in dual connectivity in which the master cell group communicates in the licensed band and the secondary cell group communicates in the unlicensed band. The base station apparatus/terminal apparatus can communicate only in the PCell in the unlicensed band. Furthermore, the base station apparatus/terminal apparatus can communicate by way of the CA or DC only in the unlicensed band. Note that the communication in which the licensed band operates as a PCell and assist a cell (SCell, PSCell) in the unlicensed band by way of, for example, the CA, the DC, or the like is also referred to as a Licensed-Assisted Access (LAA). The communication by the base station apparatus/terminal apparatus only in the unlicensed band is also referred to as an Unlicensed-standalone access (ULSA). Furthermore, the communication by the base station apparatus/terminal apparatus only in the licensed band is also referred to as a Licensed Access (LA).

Figure 2:
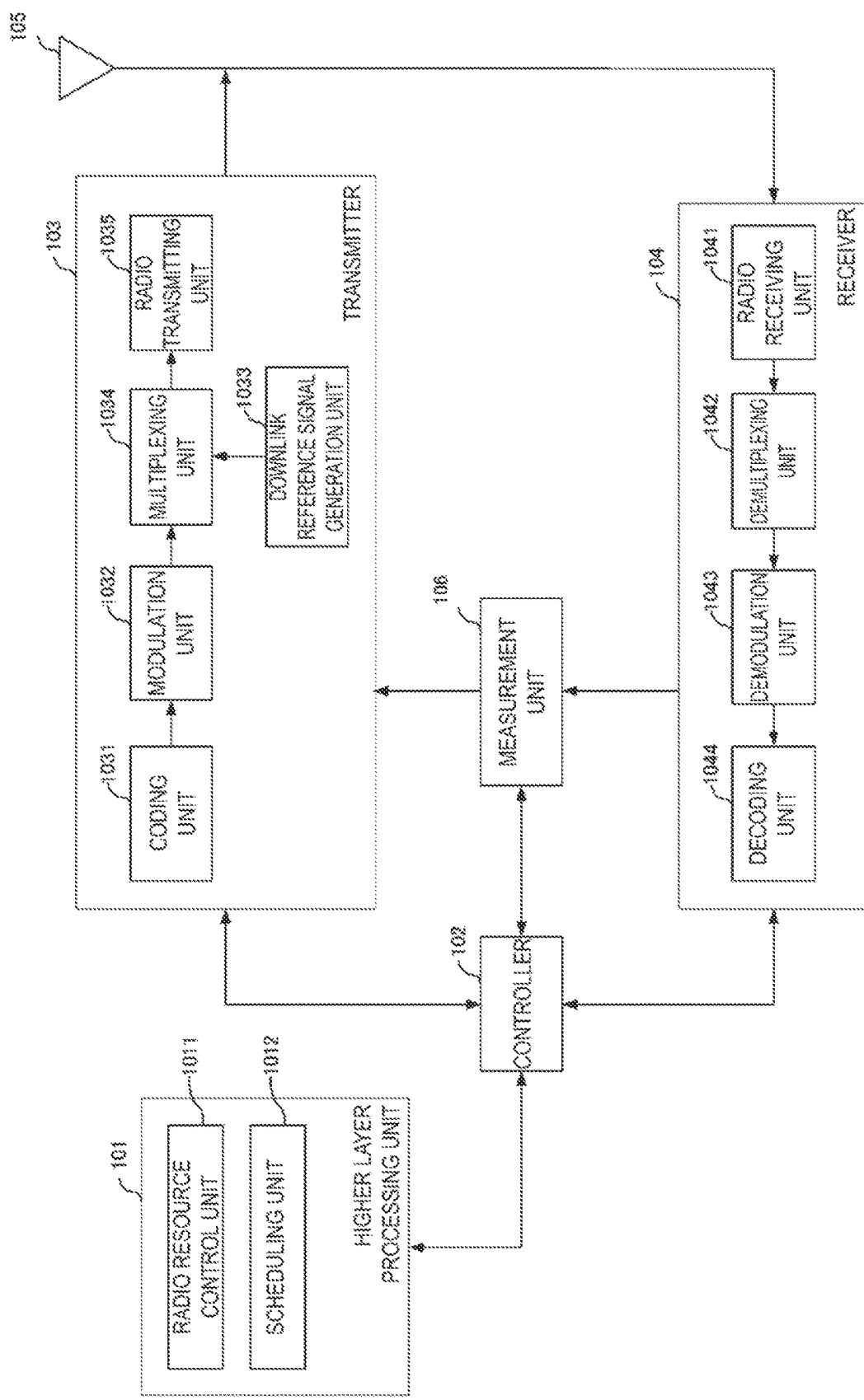
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and receive antenna 105, and a measuring unit (measuring step) 106. The higher layer processing unit 101 includes a radio resource control unit (radio resource controlling step) 1011 and a scheduling unit (scheduling step) 1012. The transmitter 103 includes a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 includes a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case where a terminal apparatus does not support a prescribed function, the terminal apparatus does not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The radio resource control unit 1011 generates, or acquires from a higher node, the downlink data (the transport block) allocated in the downlink PDSCH, system information, the RRC message, the MAC CE, and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and receive antenna 105.

The coding unit 1031 codes the HARQ indicator, the downlink control information, and the downlink data that are input from the higher layer processing unit 101, in compliance with the predefined coding scheme, such as block coding, convolutional coding, turbo coding, Low density parity check (LDPC) coding, and Polar coding, or in compliance with the coding scheme determined by the radio resource control unit 1011. The modulation unit 1032 modulates the coded bits input from the coding unit 1031, in compliance with the prescribed modulation scheme, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmission unit 1035 performs Inverse Fast Fourier Transform (IFFT) on the modulation symbol resulting from the multiplexing or the like, generates an OFDM symbol, adds a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and receive antenna 105 for transmission. The transmit power at this time is based on information configured via the controller 102.

In accordance with the control signal input from the controller 102, the receiver 104 demultiplexes, demodulates, and decodes the reception signal received from the terminal apparatus 2A through the transmit and receive antenna 105, and outputs information resulting from the decoding to the higher layer processing unit 101. Note that the receiver 104 also includes a function (step) for performing carrier sense.

The radio receiving unit 1041 converts, by down-converting, an uplink signal received through the transmit and receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. Note that the demultiplexing is performed based on radio resource allocation information, included in the uplink grant notified to each of the terminal apparatuses 2A, that is predetermined by the base station apparatus 1A by using the radio resource control unit 1011.

Furthermore, the demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus notified to the terminal apparatuses 2A in advance by using the uplink grant.

The decoding unit 1044 decodes the coded bits of PUCCH and PUSCH that have been demodulated, at a coding rate, in compliance with a predetermined coding scheme, that is predetermined or notified from the base station apparatus to the terminal apparatus 2A in advance by using the uplink grant, and outputs the decoded uplink data and uplink control information to the higher layer processing unit 101. In a case where PUSCH is retransmitted, the decoding unit 1044 performs the decoding by using the coded bits that is input from the higher layer processing unit 101 and retained in an HARQ buffer, and the demodulated coded bits.

The measuring unit 106 observes the reception signal, and determines various measurement values such as RSRP/RSRQ/RSSI. The measuring unit 106 determines a received power, a reception quality, and a preferable SRS resource index from the SRS transmitted from the terminal apparatus.

Figure 3:
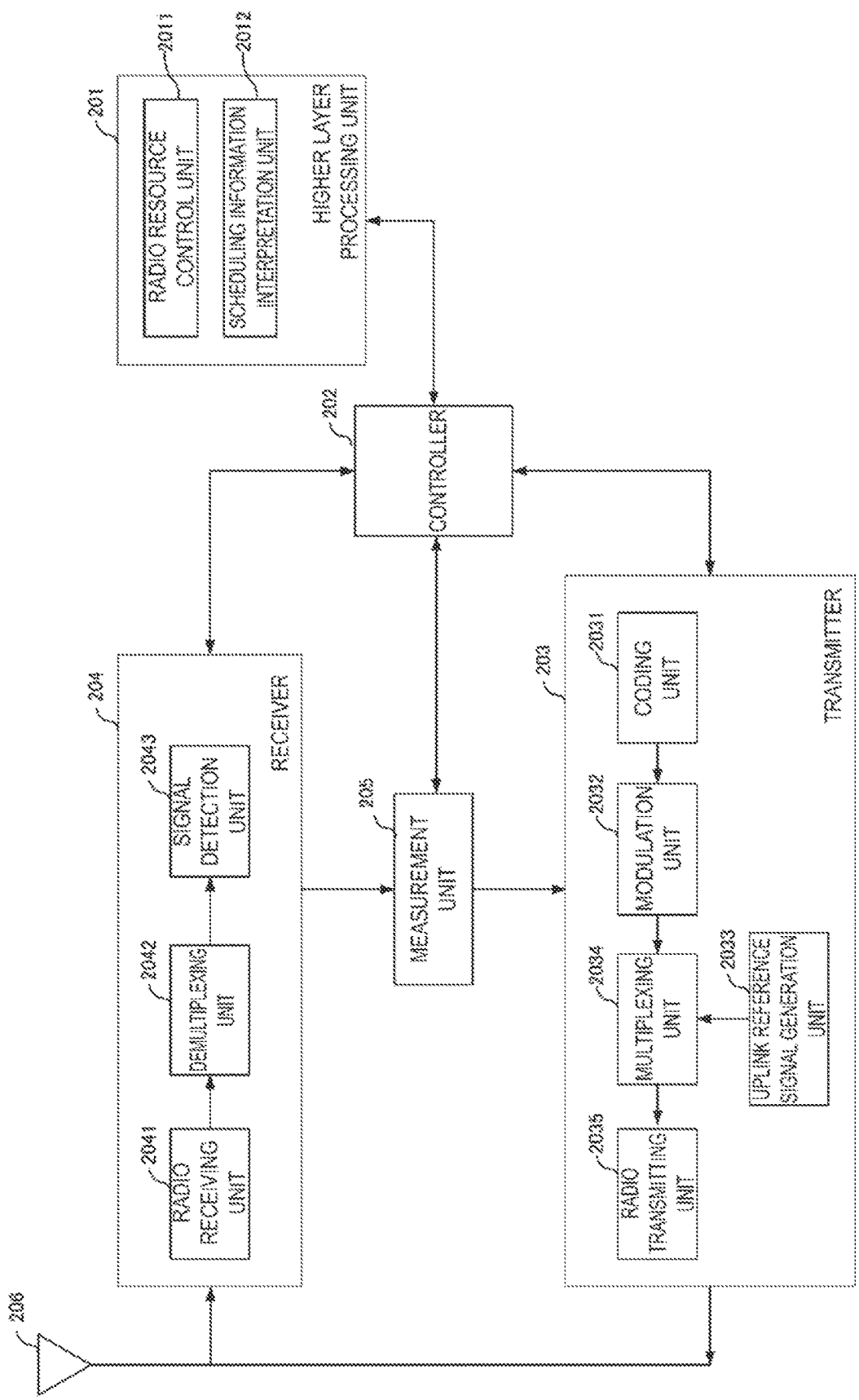
FIG. 3 is a block diagram illustrating an example configuration of a terminal apparatus according to the present embodiment.

FIG. 3 is a schematic block diagram illustrating a configuration of the terminal apparatus according to the present embodiment. As illustrated in FIG. 3, the terminal apparatus is configured to include a higher layer processing unit (higher layer processing step) 201, a controller (controlling step) 202, a transmitter (transmitting step) 203, a receiver (receiving step) 204, a measuring unit (measuring step) 205, and a transmit and receive antenna 206. The higher layer processing unit 201 is configured to include a radio resource control unit (radio resource controlling stop) 2011 and a scheduling information interpretation unit (scheduling information interpreting step) 2012. The transmitter 203 is configured to include a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured to include a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus.

Furthermore, the radio resource control unit 2011 manages various configuration information of the terminal apparatuses. Furthermore, the radio resource control unit 2011 generates information to be mapped to each uplink channel, and outputs the generated information to the transmitter 203.

The radio resource control unit 2011 acquires configuration information transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input from the higher layer processing unit 201, the controller 202 generates a control signal for controlling the receiver 204, the measuring unit 205, and the transmitter 203. The controller 202 outputs the generated control signal to the receiver 204, the measuring unit 205, and the transmitter 203 to control the receiver 204 and the transmitter 203.

The controller 202 controls the transmitter 203 to transmit the CSI/RSRP/RSRQ/RSSI generated by the measuring unit 205 to the base station apparatus.

In accordance with the control signal input from the controller 202, the receiver 204 demultiplexes, demodulates, and decodes a reception signal received from the base station apparatus through the transmit and receive antenna 206, and outputs the resulting information to the higher layer processing unit 201. Note that the receiver 204 also includes a function (step) for performing carrier sense.

The radio receiving unit 2041 converts, by down-converting, a downlink signal received through the transmit and receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, detects a signal, and outputs the detected signal to the higher layer processing unit 201.

The measuring unit 205 performs various measurements such as CSI measurement, radio resource management (RRM) measurement and radio link monitoring (RLM) measurement to determine the CSI/RSRP/RSRQ/RSSI or the like.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and receive antenna 206.

The coding unit 2031 codes the uplink control information or uplink data input from the higher layer processing unit 201 in compliance with a coding scheme such as convolutional coding, block coding, turbo coding, LDPC coding, and Polar coding.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence that is determined according to a predetermined rule (formula), based on a physical cell identity (PCI, also referred to as a cell ID or the like) for identifying the base station apparatus, a bandwidth in which the uplink reference signal is mapped, a cyclic shift notified by using the uplink grant, a parameter value for generation of a DMRS sequence, and the like.

Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmission unit 2035 performs Inverse Fast Fourier Transform (IFFT) on a signal resulting from the multiplexing, performs the modulation of OFDM scheme, generates an OFDMA symbol, adds CP to the generated OFDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and receive antenna 206 for transmission.

Note that the terminal apparatus can perform modulation of not only the OFDMA scheme but also of SC-FDMA scheme.

In a case that ultra-large capacity communication is required, such as in ultra-high definition video transmission, ultra-wideband transmission utilizing high frequency bands is desired. In the transmission in the high frequency band, it is necessary to compensate for a path loss and beamforming is important. Further, in an environment in which multiple terminal apparatuses exist in a limited area, an ultra-dense network in which the base station apparatuses are high-densely located is effective in a case that the ultra-large capacity communication is required for each terminal apparatus. However, in the case that the base station apparatuses are high-densely located, the Signal to noise power ratio (SNR) greatly improves, but strong interference due to beamforming may be caused. Accordingly, in order to realize the ultra-large capacity communication for every terminal apparatus in the limited area, interference control (avoidance, suppression, cancellation) in consideration of the beamforming and/or coordinated communication of multiple base stations are required.

Figure 4:
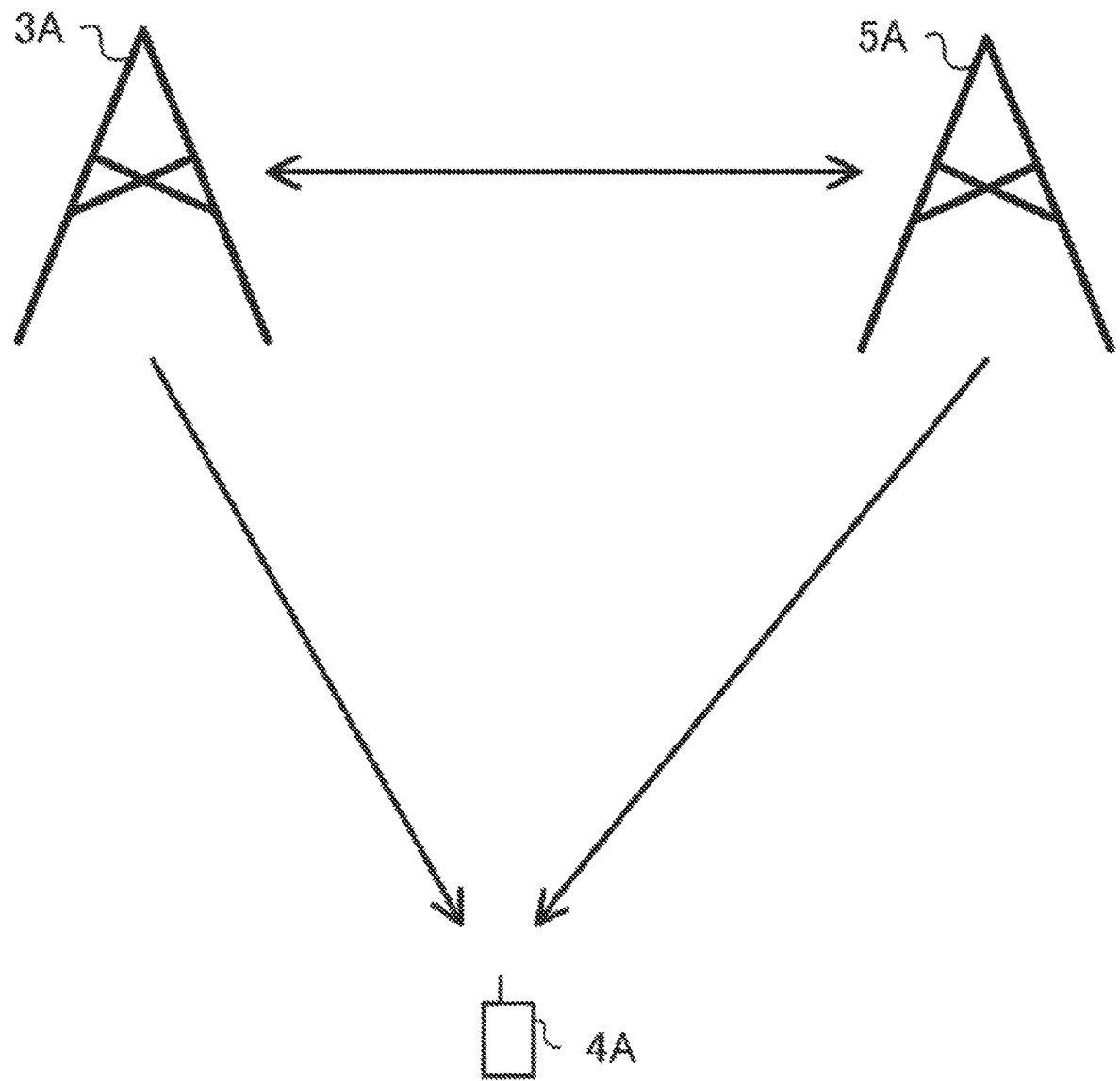
FIG. 4 is a diagram illustrating an example of a communication system according to the present embodiment.

FIG. 4 illustrates an example of a downlink communication system according to the present embodiment. The communication system illustrated in FIG. 4 includes a base station apparatus 3A, a base station apparatus 5A, and a terminal apparatus 4A. The terminal apparatus 4A can uses the base station apparatus 3A and/or the base station apparatus 5A as a serving cell. In a case that the base station apparatus 3A or the base station apparatus 5A includes many antennas, those many antennas may be divided into multiple subarrays (panels, sub-panels), and transmit/receive beamforming can be applied for each subarray. In this case, each subarray may include a communication apparatus, and a configuration of the communication apparatus is similar to the base station apparatus configuration illustrated in FIG. 2, unless otherwise specified. In a case that the terminal apparatus 4A includes multiple antennas, the terminal apparatus 4A can transmit or receive by beamforming. In a case that the terminal apparatus 4A includes many antennas, those many antennas can be divided into multiple subarrays (panels, sub-panels), and different transmit/receive beamforming can be applied for each subarray. Each subarray may include a communication apparatus, and a configuration of the communication apparatus is similar to the terminal apparatus configuration illustrated in FIG. 3, unless otherwise specified. Note that the base station apparatus 3A and the base station apparatus 5A are also simply referred to as the base station apparatuses. Note that the terminal apparatus 4A is also simply referred to as the terminal apparatus.

A synchronization signal is used to determine a preferable transmit beam for the base station apparatus and a preferable receive beam for the terminal apparatus. The base station apparatus transmits a synchronization signal block (SS block, SSB) including PSS, PBCH, and SSS. Note that, in a synchronization signal block burst set periodicity configured by the base station apparatus, one or multiple synchronization signal blocks are transmitted in the time domain, and a time index is configured for each synchronization signal block. The terminal apparatus may consider that the synchronization signal blocks having the same time index within the synchronization signal block burst set periodicity are transmitted from a quasi co-location (QCL) that delay spreads, Doppler spreads, Doppler shifts, average gains, average delays, spatial reception parameters and/or spatial transmission parameters are considered to be identical. Note that the spatial reception parameter is, for example, a channel spatial correlation, an Angle of Arrival, and the like. The spatial transmission parameter is, for example, a channel spatial correlation, an Angle of Departure, and the like. In other words, the terminal apparatus can assume that the synchronization signal blocks having the same time index within the synchronization signal block burst set periodicity have been transmitted in the same transmit beam, and the synchronization signal blocks having different time indexes have been transmitted in different beams. Accordingly, in a case that the terminal apparatus reports to the base station apparatus information indicating a time index of a preferable synchronization signal block within the synchronization signal block burst set periodicity, the base station apparatus can recognize a transmit beam preferable for the terminal apparatus. The terminal apparatus can determine a receive beam preferable for the terminal apparatus using synchronization signal blocks having the same time index in different synchronization signal block burst set periodicities. Thus, the terminal apparatus can associate the time index of the synchronization signal block with a receive beam direction and/or a subarray. Note that, in a case that the terminal apparatus includes multiple subarrays, the terminal apparatus may use different subarrays in connecting to different cells.

The CSI-RS can be used to determine a preferable transmit beam for the base station apparatus and a preferable receive beam for the terminal apparatus. The base station apparatus can configure the configuration information through the higher layer signaling. For example, the configuration information includes some or all of the resource configuration and the reporting configuration.

The resource configuration includes the resource set configuration ID, the resource configuration type, and/or a configuration of a set of one or multiple CSI-RS resources. The resource configuration ID is used to identify the resource configuration. The resource configuration type indicates a time domain behavior of the resource configuration. Specifically, indicated is whether the resource configuration is a configuration for aperiodically transmitting a CSI-RS, a configuration for periodically transmitting a CSI-RS, or a configuration for semi-persistently transmitting a CSI-RS. The CSI-RS resource set configuration includes a CSI-RS resource set configuration ID and/or one or multiple CSI-RS resource configurations. The CSI-RS resource set configuration ID is used to identify the CSI-RS resource set configuration. The CSI-RS resource configuration includes some or all of the CSI-RS resource configuration ID, the resource configuration type, the number of antenna ports, CSI-RS resource mapping, and a power offset of the CSI-RS and the PDSCH. The CSI-RS resource configuration ID is used to identify the CSI-RS resource configuration, and the CSI-RS resources are associated by the CSI-RS resource configuration ID. The CSI-RS resource mapping indicates resource elements in a slot to which CSI-RS is allocated (OFDM symbol, subcarrier).

The resource configuration is used for CSI measurement or RRM measurement. The terminal apparatus receives the CSI-RS in the configured resource, calculates CSI from the CSI-RS, and reports the CSI to the base station apparatus. In a case that the CSI-RS resource set configuration includes multiple CSI-RS resource configurations, the terminal apparatus receives the CSI-RS in the same receive beam in each CSI-RS resource and calculates the CRI. For example, in a case that the CSI-RS resource set configuration includes K CSI-RS resource configurations (where K is an integer of 2 or greater), the CRI indicates N preferable CSI-RS resources from among K CSI-RS resources. Here N is a positive integer less than K. In a case that the CRI indicates multiple CSI-RS resources, the terminal apparatus can report the CSI-RSRP measured by each CSI-RS resource to the base station apparatus to indicate which CSI-RS resource quality is good. In a case that the base station apparatus beamforms (precodes) and transmits the CSI-RS in different beam directions in the multiple configured CSI-RS resources, the base station apparatus can recognize a transmit beam direction of the base station apparatus preferable for the terminal apparatus by the CRI reported from the terminal apparatus. On the other hand, a preferable receive beam direction for the terminal apparatus can be determined using the CSI-RS resource in which the transmit beam of the base station apparatus is fixed. For example, the base station apparatus transmits information indicating whether a transmit beam of the base station apparatus is fixed, and/or a periodicity in which the transmit beam is fixed, with respect to a certain CSI-RS resource. The terminal apparatus can determine a preferable receive beam direction from the CSI-RS received in receive beam directions different from each other, in the CSI-RS resource in which the transmit beam is fixed. Note that the terminal apparatus may report the CSI-RSRP after determining the preferable receive beam direction. Note that in a case that the terminal apparatus includes multiple subarrays, the terminal apparatus can select a preferable subarray in determining the preferable receive beam direction. Note that the preferable receive beam direction of the terminal apparatus may be associated with the CRI. In a case that the terminal apparatus reports multiple CRIs, the base station apparatus can fix the transmit beam in the CSI-RS resource associated with each CRI. At this time, the terminal apparatus can determine a preferable receive beam direction for each CRI. For example, the base station apparatus can transmit a downlink signal/channel in association with a CRI. At this time, the terminal apparatus must perform reception in a receive beam associated with the CRI. In the multiple configured CSI-RS resources, the different base station apparatuses can transmit the CSI-RS. In this case, the network side can recognize the base station apparatus with which the communication quality is good by way of the CRI. In the case that the terminal apparatus includes multiple subarrays, the terminal apparatus can perform reception in the multiple subarrays at the same timing. Accordingly, in a case that the base station apparatus transmits multiple layers (codeword, transport block) each of which is associated with the CRI by way of the downlink control information or the like, the terminal apparatus can receive multiple layers using a subarray and receive beam corresponding to each CRI. However, in using an analog beam, in a case that there is one receive beam direction used at the same timing in one subarray, and that two CRIs corresponding to one subarray of the terminal apparatus are simultaneously configured, the terminal apparatus may not be able to perform reception in the multiple receive beams. To avoid this problem, for example, the base station apparatus groups the multiple configured CSI-RS resources, and determines the CRI using the same subarray in a group. In addition, in a case that different subarrays are used between groups, the base station apparatus can recognize multiple CRIs that can be configured at the same timing. Note that the group of CSI-RS resources may be a CSI-RS resource set. Note that the CRIs that can be configured at the same timing may be QCL. At this time, the terminal apparatus can transmit the CRI in association with the QCL information. For example, in a case that the terminal apparatus distinguishes and reports a CRI that is QCL and a CRI that is not QCL, the base station apparatus can configure no CRI being QCL at the same timing and configure the CRI not being QCL at the same timing. The base station apparatus may request the CSI for each subarray of the terminal apparatus. In this case, the terminal apparatus reports the CSI for each subarray. Note that, in a case that the terminal apparatus reports multiple CRIs to the base station apparatus, the terminal apparatus may report only the CRI that is not QCL.

The reporting configuration is a configuration related to the CSI report, and includes a reporting configuration ID, a reporting configuration type, and/or a report value (amount). The reporting configuration ID is used to identify the reporting configuration. The report value (amount) is a CSI value (amount) reported. The reporting configuration type indicates whether the reporting configuration is a configuration for aperiodically reporting the CSI value (amount), a configuration for periodically reporting the CSI value (amount), or a configuration for semi-persistently reporting the CSI value (amount).

In a case that the CSI is aperiodically or semi-persistently reported, the base station apparatus transmits, to the terminal apparatus, a trigger (trigger information) to initiate the CSI report. The trigger can be DCI or higher layer signaling.

In order to determine a preferable transmit beam of the base station apparatus, a codebook is used in which candidates of a prescribed precoding (beamforming) matrix (vector) are defined. The base station apparatus transmits the CSI-RS, and the terminal apparatus determines a preferable precoding (beamforming) matrix from among the codebooks to report the matrix as a PMI to the base station apparatus. This allows the base station apparatus to recognize a transmit beam preferable for the terminal apparatus. Note that the codebook includes a precoding (beamforming) matrix that combines antenna ports and a precoding (beamforming) matrix that selects an antenna port. In a case that a codebook for selecting the antenna port is used, the base station apparatus can use a different transmit beam direction for each antenna port. Accordingly, in a case that the terminal apparatus reports an antenna port preferable as the PMI, the base station apparatus can recognize a preferable transmit beam direction. Note that the preferable receive beam of the terminal apparatus may be in the receive beam direction associated with the CRI, or a preferable receive beam direction may be again determined. In the case that a codebook for selecting the antenna port is used, and that the preferable receive beam direction of the terminal apparatus is the receive beam direction associated with the CRI, the receive beam direction for receiving the CSI-RS is desirably received in the receive beam direction associated with the CRI. Note that even in a case that the receive beam direction associated with the CRI is used, the terminal apparatus can associate the PMI with the receive beam direction. Also, in the case that a codebook for selecting the antenna port is used, each antenna port may be transmitted from a different base station apparatus (cell). In this case, in a case that the terminal apparatus reports the PMI, the base station apparatus can recognize the base station apparatus (cell) with which the communication quality is preferable. Note that in this case, the antenna ports of the different base station apparatuses (cells) can be assumed not to be QCL.

In a case that the CSI is reported in PUSCH or the sub-band CSI is reported in PUCCH, the CSI is divided into two parts and reported. In addition, the CSI report includes a type 1 CSI report and a type 2 CSI report. In the type 1 CSI report, a CSI based on the type 1 codebook (also referred to as a type 1 CSI) is reported. In the type 2 CSI reporting, a CSI based on the type 2 codebook (also referred to as a type 2 CSI) is reported. Those two parts are also referred to as a first part (part 1, CSI part 1), and a second part (part 2, CSI part 2). Note that the priority of the CSI report is higher in the first part than in the second part. For example, in a case that the RI is 4 or less, the first part includes some or all of a sum of a first RI and a second RI (or the second RI), a second CRI, a first CRI, and a CQI based on second CRI (or a second CQI). The second part includes some or all of the first CRI, the first RI, the first CQI, a first PMI, and a second PMI. In a case that the RI is greater than 4, the first part includes some or all of the sum of the first RI and the second RI (or second RI), the second CRI, and the second CQI. The second part includes some or all of the first CRI, the first RI, the first CQI, the first PMI, and the second PMI. Note that the CSI may be divided into three parts. The third part is also referred to as a third part (part 3, CSI part 3). Note that the priority in the third is lower than in the second part. At this time, the first part includes some or all of the sum of the first RI and the second RI (or the second RI), the second CRI, the first CRI, and the CQI based on second CRI (or the second CQI). The second part includes some or all of the first CRI, the first RI, and the first CQI. The third part includes some or all of the first PMI and the second PMI.

Note that the terminal apparatus may divide each of the CSI based on the first CRI and the CSI based on the second CRI into two parts, and report the parts. Note that two parts of the CSI based on the first CRI are also referred to as a first part 1 and a first part 2. Two parts of the CSI based on the second CRI are also referred to as a second part 1 and a second part 2. Note that the first part 1 includes some or all of the first CRI, the first RI, and the first CQI. The first part 2 includes the first PMI. The second part 1 includes some or all of the second CRI, the second RI, and the second CQI. The second part 2 includes the second PMI. Note that the priority of the CSI can be configured to be higher in order of the second part 1, the first part 1, the second part 2, and the first part 2. At this time, the terminal apparatus reports a CSI having a long periodicity (less change) in the second CRI and the first CRI, and the base station apparatus and the terminal apparatus can communicate using the minimum parameters for the first CRI and the second CRI. In addition, the priority of the CSI can be configured to be higher in order of the second part 1, the second part 2, the first part 1, and the first part 2. At this time, the terminal apparatus preferentially reports the complete CSI in the second CRI, allowing the base station apparatus and the terminal apparatus to communicate using detailed parameters for the second CRI.

In addition to the serving cell, the terminal apparatus 4A may receive an interference signal (neighbor cell interference) from neighbor cells. The interference signal is PDSCH, PDCCH, or a reference signal of the neighbor cell. In this case, the cancellation or suppression of the interference signal in the terminal apparatus is effective. Applicable schemes for cancelling or suppressing the interference signal include an Enhanced-Minimum Mean Square Error (E-MMSE) that estimates the channel of the interference signal and performs suppression by a linear weight, an interference canceler that generates an interference signal replica and performs cancellation, a Maximum Likelihood Detection (MLD) that searches all of the desired signals and the transmit signal candidates of the interference signal to detect a desired signal, and a Reduced complexity-MLD (R-MLD) with a lower amount of computation than the MLD by reducing the transmit signal candidates. In order to apply these schemes, channel estimation of the interference signal, demodulation of the interference signal, or decoding of the interference signal is required. Therefore, in order to efficiently cancel or suppress the interference signal, the terminal apparatus needs to recognize the parameters of the interference signal (neighbor cell). As such, the base station apparatus can transmit (configure) assistance information including the parameters of the interference signal (neighbor cell) to the terminal apparatus to assist the terminal apparatus in cancelling or suppressing the interference signal. One or multiple pieces of the assistance information are configured. The assistance information includes, for example, some or all of a physical cell ID, a virtual cell ID, a power ratio (power offset) of the reference signal to the PDSCH, a scrambling identity of the reference signal, the quasi co-location information (QCL information), the CSI-RS resource configuration, the number of CSI-RS antenna ports, a subcarrier spacing, resource allocation granularity, resource allocation information, the DMRS configuration, the DMRS antenna port number, the number of layers, TDD Dl/UL configuration, the PMI, the RI, the modulation scheme, and the Modulation and coding scheme (MCS). Note that the virtual cell ID is an ID virtually assigned to the cell, and cells may have the same physical cell ID and different virtual cell IDs. The QCL information is information about QCL for a prescribed antenna port, a prescribed signal, or a prescribed channel. In a case that a long term performance of a channel on which a symbol is carried on one antenna port of two antenna ports can be estimated from a channel on which a symbol is carried on the other antenna port, those two antenna ports are said to be QCL. The long term performance includes a delay spread, a Doppler spread, a Doppler shift, an average gain, an average delay, a spatial reception parameter, and/or a spatial transmission parameter. In other words, in a case that two antenna ports are QCL, the terminal apparatus can consider that those two antenna ports have the same long term performance. A subcarrier spacing indicates a subcarrier spacing of the interference signals or a candidate of a subcarrier spacing that may be used in the band. Note that, in a case that the subcarrier spacing included in the assistance information is different from the subcarrier spacing used in the communication with the serving cell, the terminal apparatus may not cancel or suppress the interference signal. The candidate of the subcarrier spacing that may be used in the band may indicate a commonly used subcarrier spacing. For example, the commonly used subcarrier spacing may not include a low frequency subcarrier spacing as used for highly reliable and low latency communication (emergency communication). The resource allocation granularity indicates the number of resource blocks in which the precoding (beamforming) remains unchanged. The DMRS configuration indicates a PDSCH mapping type and an additional allocation of the DMRS. DMRS resource allocation varies depending on the PDSCH mapping type. For example, in a PDSCH mapping type A, the DMRS is mapped to the third symbol of the slot. For example, in a PDSCH mapping type B, the DMRS is mapped to the first OFDM symbol of the allocated PDSCH resource. The additional allocation of the DMRS indicates whether or not an additional DMRS is allocated, or an allocation to be added. Note that some or all of the parameters included in the assistance information are transmitted (configured) through higher layer signaling. Furthermore, some or all of the parameters included in the assistance information are transmitted by way of the downlink control information. In a case that each of the parameters included in the assistance information indicates multiple candidates, the terminal apparatus blind detects a preferable one from among the candidates. Further, the parameter not included in the assistance information is blind detected by the terminal apparatus.

In a case that the terminal apparatus communicates using multiple receive beam directions, ambient interference conditions vary greatly depending on the receive beam direction. For example, an interference signal that is strong in one receive beam direction may be weaker in another receive beam direction. The assistance information of the cell that is unlikely to interfere strongly may not only be meaningless, but may also involve wasteful calculation in determining whether a strong interference signal is received. Accordingly, it is desirable that the assistance information be configured for each receive beam direction. However, because the base station apparatus does not necessarily recognize the receive direction of the terminal apparatus, information for the receive beam direction needs to be associated with the assistance information. For example, since the terminal apparatus can associate the CRI with the receive beam direction, the base station apparatus can transmit (configure) one or multiple pieces of the assistance information for each CRI. Moreover, since the terminal apparatus can associate the time index of the synchronization signal block with the receive beam direction of the synchronization signal block, the base station apparatus can transmit (configure) one or multiple pieces of the assistance information for each time index of the synchronization signal block. Since the terminal apparatus can associate the PMI (antenna port number) with the receive beam direction, the base station apparatus can transmit (configure) one or multiple pieces of the assistance information for each PMI (antenna port number). In the case that the terminal apparatus includes multiple subarrays, the receive beam direction is likely to change for each subarray, so the base station apparatus can transmit (configure) one or multiple pieces of the assistance information for each index associated with the subarray of the terminal apparatus. Furthermore, in a case that multiple base station apparatuses (transmission and reception points) communicate with the terminal apparatus, the terminal apparatus is likely to communicate with each of the base station apparatuses (transmission and/or reception points) in different receive beam directions. Thus, the base station apparatus transmits (configures) one or multiple pieces of the assistance information for each piece of information indicating the base station apparatus (transmission and/or reception point). The information indicating the base station apparatus (transmission and/or reception point) may be a physical cell ID or a virtual cell ID. In a case that different DMRS antenna port numbers are used for the base station apparatuses (transmission and/or reception points), information indicating the DMRS antenna port number and the DMRS antenna group is information indicating the base station apparatus (transmission and/or reception point).

Note that the number of pieces of the assistance information configured by the base station apparatus for each CRI can be common. Here, the number of pieces of the assistance information refers to the type of assistance information, the number of elements of each piece of the assistance information (e.g., the number of candidates of the cell ID), and the like. A maximum value is configured for the number of pieces of the assistance information configured by the base station apparatus for each CRI, and the base station apparatus can configure the assistance information for each CRI within the range of the maximum value.

Note that in a case that the receive beam direction of the terminal apparatus changes, the transmit antenna is unlikely to be QCL. Accordingly, the assistance information can be associated with the QCL information. For example, in a case that the base station apparatus transmits (configures) the assistance information for multiple cells, a cell being QCL (or a cell not being QCL) can be indicated to the terminal apparatus. to the terminal apparatus.

Note that the terminal apparatus cancels or suppresses the interference signal using the assistance information associated with the CRI used for communication with the serving cell.

The base station apparatus may configure the assistance information associated with the receive beam direction (CRI/time index of synchronization signal block/PMI/antenna port number/subarray) and the assistance information not associated with the receive beam direction (CRI/time index of synchronization signal block/PMI/antenna port number/subarray). Further, the assistance information associated with the receive beam direction and the assistance information not associated with the receive beam direction may be selectively used in the capability and category of the terminal apparatus. The capability and category of the terminal apparatus may indicate whether or not the terminal apparatus supports the receive beamforming. The assistance information associated with the receive beam direction and the assistance information not associated with the receive beam direction may be selectively used in the frequency band. For example, the base station apparatus does not configure the assistance information associated with the receive beam direction at frequencies lower than 6 GHz. For example, the base station apparatus configures the assistance information associated with the receive beam direction only at frequencies higher than 6 GHz.

Note that the CRI may be associated with the CSI resource set configuration ID. In a case that the base station apparatus indicates the CRI to the terminal apparatus, the base station apparatus may indicate the CRI along with the CSI resource set configuration ID. Note that in a case that the CSI resource set configuration ID is associated with one CRI or one receive beam direction, the base station apparatus may configure the assistance information for each CSI resource set configuration ID.

The base station apparatus requests the terminal apparatus to measure the neighbor cell in order to recognize the neighbor cells associated with the receive beam direction of terminal apparatus. The neighbor cell measurement request includes information associated with the receive beam direction of the terminal apparatus and a cell ID. In a case of receiving the neighbor cell measurement request, the terminal apparatus measures the RSRP/RSRQ/RSSI of the neighbor cell, and reports the measured RSRP/RSRQ/RSSI together with the information for the receive beam direction of the terminal apparatus to the base station apparatus. Note that the information for the receive beam direction of the terminal apparatus is information indicating the CRI, the time index of the synchronization signal block, the subarray of the terminal apparatus, or the base station apparatus (transmission and/or reception point).

In addition, in a case that the terminal apparatus moves, the surrounding environment may change from time to time. Accordingly, it is desirable for the terminal apparatus to observe the surrounding channel conditions, interference conditions, and the like at a prescribed timing and report to the base station apparatus. Report results are reported in a periodic report or an event report. In the case of the periodic report, the terminal apparatus periodically measures and reports the RSRP/RSRQ by the synchronization signal or the CSI-RS. In the case of the event report, the event ID is associated with conditions related to the report. The event ID may include, for example, those as follows, and may be configured with a threshold required to calculate a condition (if necessary, a threshold 1, a threshold 2), and an offset value.

Event A1: A case that the measurement result of the serving cell is better than the configured threshold.

Event A2: A case that the measurement result of the serving cell is worse than the configured threshold.

Event A3: A case that the measurement result of the neighbor cell is better than a measurement result of the PCell/PSCell by the configured offset value or more.

Event A4: A case that the measurement result of the neighbor cell is better than the configured threshold.

Event A5: A case that the measurement result of the PCell/PSCell is worse than the configured threshold 1, and the measurement result of the neighbor cell is better than the configured threshold 2.

Event A6: A case that the measurement result of the neighbor cell is better than a measurement result of the SCell by the configured offset value or more.

Event C1: A case that the measurement result in the CSI-RS resource is better than the configured threshold.

Event C2: A case that the measurement result in the CSI-RS resource is better than a measurement result in the configured reference CSI-RS resource by the offset amount or more.

Event D1: A case that the measurement result of the CSI-RS resource different from the CRI is better than the configured threshold.

Event D2: A case that the measurement result of the CSI-RS resource associated with the CRI is worse than the configured threshold.

Event D3: A case that the measurement result in the receive beam direction not associated with the CRI is better than the configured threshold.

Event D4: A case that the measurement result of the SS block index used for synchronization is worse than the configured threshold.

Event D5: A case that the measurement result of the SS block index not used for synchronization is worse than the configured threshold.

Event E1: A case that a time elapsed since the base station apparatus determines the beam exceeds a threshold. Event E2: A case that a time elapsed since the terminal apparatus determines the beam exceeds a threshold.

In a case of reporting based on the reporting configuration, the terminal apparatus reports the SS-RSRP/SS-RSRQ/CSI-RSRP/CSI-RSRQ/RSSI as a measurement result.

Figure 5:
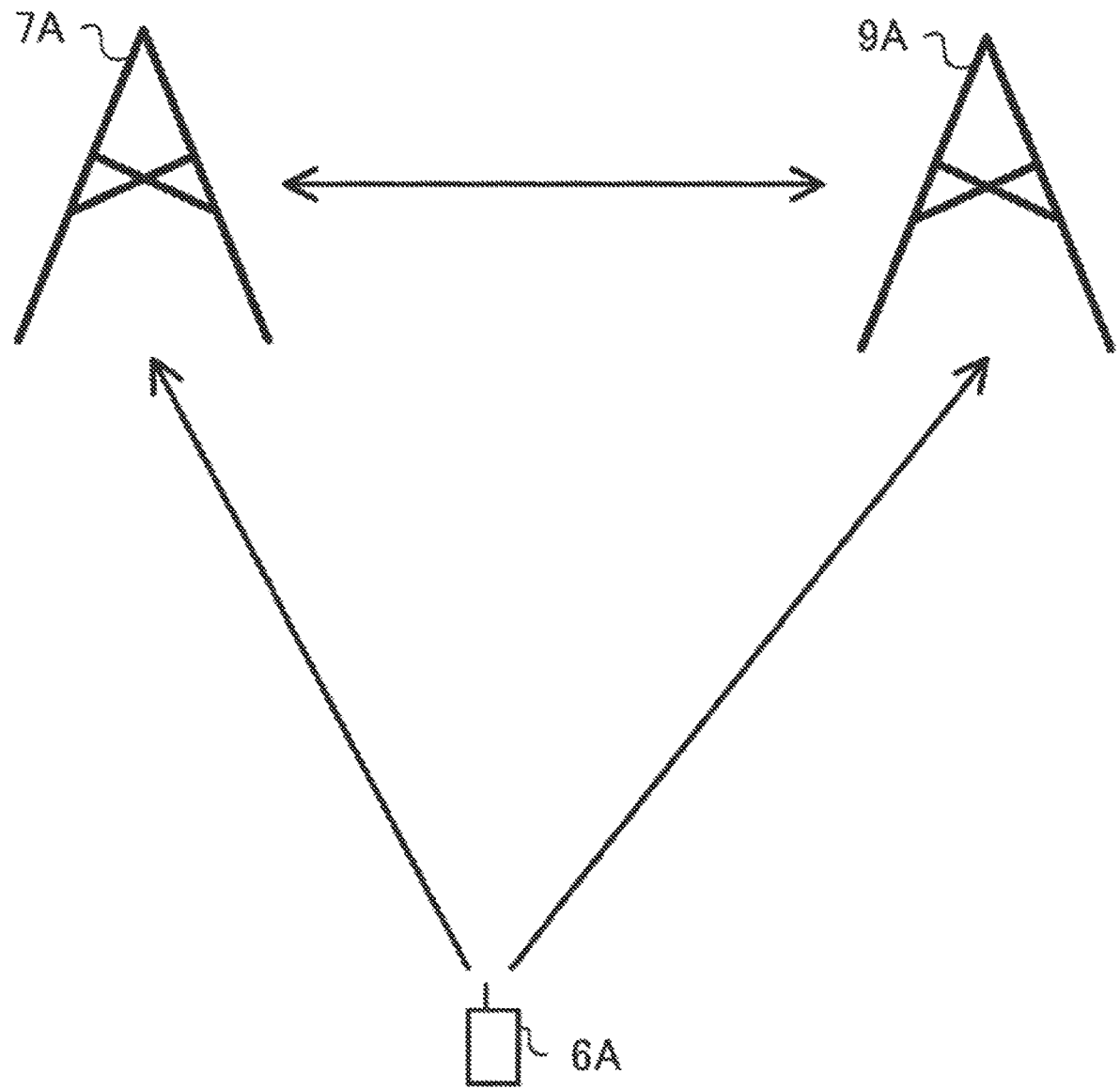
FIG. 5 is a diagram illustrating an example of a communication system according to the present embodiment.

FIG. 5 illustrates an example of an uplink communication system according to the present embodiment. The communication system illustrated in FIG. 5 includes a base station apparatus 7A, a base station apparatus 9A, and a terminal apparatus 6A. The terminal apparatus 6A can uses the base station apparatus 7A and/or the base station apparatus 9A as a serving cell. In a case that the base station apparatus 7A or the base station apparatus 9A includes many antennas, those many antennas may be divided into multiple subarrays (panels, sub-panels), and transmit/receive beamforming can be applied for each subarray. In this case, each subarray may include a communication apparatus, and a configuration of the communication apparatus is similar to the base station apparatus configuration illustrated in FIG. 2, unless otherwise specified. In a case that the terminal apparatus 6A includes multiple antennas, the terminal apparatus 6A can transmit or receive by beamforming. In a case that the terminal apparatus 6A includes many antennas, those many antennas can be divided into multiple subarrays (panels, sub-panels), and different transmit/receive beamforming can be applied for each subarray. Each subarray may include a communication apparatus, and a configuration of the communication apparatus is similar to the terminal apparatus configuration illustrated in FIG. 3, unless otherwise specified. Note that the base station apparatus 7A and the base station apparatus 9A are also simply referred to as the base station apparatuses. Note that the terminal apparatus 6A is also simply referred to as the terminal apparatus.

An SRS is used to determine a preferable transmit beam for the terminal apparatus and a preferable receive beam for the base station apparatus in the uplink. The base station apparatus can transmit (configure) the configuration information for the SRS through higher layer signaling. The configuration information includes one or multiple SRS resource set configurations. The SRS resource set configuration includes an SRS resource set configuration ID and/or one or multiple SRS resource configurations. The SRS resource set configuration ID is used to identify the SRS resource set configuration. The SRS resource configuration includes an SRS resource configuration ID, the number of SRS antenna ports, an SRS transmission Comb, SRS resource mapping, an SRS frequency hopping, and an SRS resource configuration type. The SRS resource configuration ID is used to identify the SRS resource configuration. The SRS transmission comb indicates a frequency spacing of a comb toothed spectrum and a position (offset) within the frequency spacing. The SRS resource mapping indicates positions and the number of OFDM symbols to which the SRS is allocated in a slot. The SRS frequency hopping is information indicating the frequency hopping of the SRS. The SRS resource configuration type indicates a behavior of the SRS resource configuration in the time domain. Specifically, indicated is whether the SRS resource configuration is a configuration for aperiodically transmitting an SRS, a configuration for periodically transmitting an SRS, or a configuration for semi-persistently transmitting an SRS.

In a case that multiple SRS resources are configured and the terminal apparatus performs transmission in different transmit beam directions in the respective SRS resources, the base station apparatus can determine a preferable SRS resource. In a case that the base station apparatus transmits (indicates) to the terminal apparatus an SRS Resource Indicator (SRI) that is information indicating the SRS resource, the terminal apparatus can recognize that the transmit beam direction of the transmission in the SRS resource is preferable. Note that the base station apparatus can request the terminal apparatus to transmit the same transmit beam for a prescribed periodicity of time in order to obtain a preferable receive beam for the base station apparatus. The terminal apparatus transmits, in accordance with the request from the base station apparatus, for the indicated periodicity in the indicated SRS resource in the same transmit beam direction as that transmitted in the indicated SRI.

In the case that the terminal apparatus includes multiple subarrays, the terminal apparatus can communicate with multiple base station apparatuses (transmission and reception points). In the example in FIG. 5, the terminal apparatus 6A can use the base station apparatus 7A and/or the base station apparatus 9A as a serving cell. In this case, the transmit beam direction preferable for communication with the base station apparatus 7A and the transmit beam direction preferable for communication with the base station apparatus 9A are likely to be different for the terminal apparatus 6A. Accordingly, the terminal apparatus 6A can communicate with the base station apparatus 7A and the base station apparatus 9A at the same timing by transmitting in different subarrays and in different transmit beam directions.

In a case that the terminal apparatus transmits the SRS in an SRS resource using the multiple antenna ports, different transmit beam directions can be used for the respective antenna ports. Accordingly, in a case that the base station apparatus indicates transmission using a preferable antenna port number to the terminal apparatus, the terminal apparatus can recognize a preferable transmit beam direction. Note that the base station apparatus can also indicate a transmit PMI (TPMI) to the terminal apparatus using a codebook for selecting the antenna port. The base station apparatus can indicate which code book is to be referred to, to the terminal apparatus. The terminal apparatus can refer to the indicated codebook to use the transmit beam direction corresponding to the antenna port number indicated by the TPMI.

In the case that the terminal apparatus includes multiple subarrays, and in a case that the terminal apparatus can transmit at the same timing in the multiple subarrays, the terminal apparatus can apply different antenna port numbers to the subarrays. At this time, in a case that the terminal apparatus transmits the SRS from the different antenna ports of the subarrays by using the transmit beam and receives the TPMI from the base station apparatus, the terminal apparatus can recognize the preferable subarray and transmit beam direction. Accordingly, the terminal apparatus can associate the TPMI with the subarray and the transmit beam direction.

Note that in the case that the terminal apparatus communicates with multiple base station apparatuses (transmission and/or reception points), the terminal apparatus can transmit the same signal (data) or a different signal (data) to each of the base station apparatuses (transmission and/or reception points). In a case that the terminal apparatus communicates with multiple base station apparatuses (transmission and reception points) using the same signal (data), the signals received by the multiple base station apparatuses (transmission and reception points) can be combined to improve reception quality, and thus, it is desirable that the multiple base station apparatuses (transmission and reception points) coordinate to perform the reception processing.

The base station apparatus can use the DCI for scheduling PUSCH. In the case that the terminal apparatus communicates with multiple base station apparatuses, each base station apparatus can transmit the DCI for scheduling the PUSCH. The DCI includes the SRI and/or the TPMI, and the terminal apparatus can recognize a transmit beam preferable for the base station apparatus. In the case that the terminal apparatus communicates with multiple base station apparatuses, the terminal apparatus can transmit the PUSCH to the multiple base station apparatuses by using the DCI from one base station apparatus. For example, in a case that the DCI includes control information for multiple layers (codewords, transport blocks), and the SRI and/or the TPMI are indicated (configured) for each layer, each layer is transmitted in a transmit beam preferable for each base station apparatus. This allows the terminal apparatus, in the case of receiving one DCI, to transmit different signals (data) to the multiple base station apparatuses. In a case that the DCI includes control information for one layer and multiple SRIs and/or TPMIs are indicated (configured) for one layer, the terminal apparatus transmits one layer (the same data) by using different transmit beams. This allows the terminal apparatus, in the case of receiving one DCI, to transmit the same signal (data) to the multiple base station apparatuses.

In a case that the terminal apparatus transmits to multiple base station apparatuses at the same timing, each base station apparatus desirably recognizes the quality of communication with the terminal apparatus at the same timing. Thus, the base station apparatus can indicate (trigger) the SRS resources corresponding to multiple SRIs and each SRI by using one DCI. In other words, in a case that the terminal apparatus transmits the SRS in the transmit beam direction corresponding to each SRI at the same timing, the respective base station apparatuses can recognize the quality of communication with the terminal apparatus at the same timing.

In a case that only one transmit beam direction is used in the subarray included in the terminal apparatus at the same timing, transmission to the multiple base station apparatuses is performed in different the subarrays at the same timing. At this time, in a case that two SRIs are indicated (configured) by way of one DCI from the base station apparatus and that two SRIs are associated with the same subarray, the terminal apparatus may not be able to perform the transmission corresponding to those two SRIs at the same timing. To avoid this problem, for example, the base station apparatus can group and configure the multiple SRS resources, and request the terminal apparatus to transmit the SRS using the same subarray in a group. In addition, in a case that different subarrays are used between groups, the base station apparatus can recognize multiple SRIs that can be configured at the same timing. Note that the group of SRS resources may be an SRS resource set. Note that the SRSs (SRS resources) that can be configured at the same timing may not be QCL. At this time, the terminal apparatus can transmit the SRS in association with the QCL information. For example, the terminal apparatus distinguishes and transmits an SRS that is QCL and an SRS that is not QCL, allowing the base station apparatus to configure no SRI being QCL at the same timing and to configure the SRI not being QCL at the same timing. The base station apparatus may request the SRS for each subarray of the terminal apparatus. In this case, the terminal apparatus transmits the SRS for each subarray.

Note that in the case that two SRIs that cannot be transmitted at the same timing are indicated to the terminal apparatus by the base station apparatus, the terminal apparatus can transmit to the base station apparatus a request of a beam recovery procedure for reselecting the transmit beam. The beam recovery procedure is a procedure performed in a case that the terminal apparatus is out of tracking of the transmit and/or receive beam for the base station apparatus, and the communication quality is significantly decreased, and the terminal apparatus needs to acquire a new connection destination (transmit beam of the base station apparatus) in advance. The terminal apparatus according to the present embodiment can use the beam recovery procedure in order to eliminate a state in which the transmit beam itself is secured, but two SRIs that cannot be transmitted at the same timing are configured.

The terminal apparatus according to the present embodiment can include multiple antennas (antenna panels) configured with independent beamforming. The terminal apparatus according to the present embodiment can use multiple antenna panels. Of course, the terminal apparatus can use and switch between the multiple antenna panels, but in a case that the antenna panel is not appropriately selected, transmission quality is significantly decreased, particularly in high frequency transmission. Thus, the terminal apparatus can perform beam scanning (searching) between the terminal apparatus and the base station apparatus to select beamforming configured for the antenna. The terminal apparatus according to the present embodiment can transmit the SRS in order to perform the beam scanning.

The base station apparatus according to the present embodiment can notify the terminal apparatus of information indicating duality (relationship, reciprocity) for the downlink and uplink propagation (channel) performance. The base station apparatus can notify the terminal apparatus of, as the information for the propagation performance, information indicating Beam Correspondence (Spatial relation, Spatial relation information, reception parameters). Here, the beam correspondence includes information indicating association between the receive beamforming (spatial domain receiving filter, reception weight, reception parameter, reception spatial parameter) used by the terminal apparatus in receiving the downlink signal, and the transmit beamforming (spatial domain transmission filter, transmission weight, transmission parameter, transmission spatial parameter) used in transmitting the uplink signal.

The base station apparatus can configure the beam correspondence for each signal transmitted by the terminal apparatus. For example, the base station apparatus can notify the terminal apparatus of information indicating the beam correspondence for the SRS transmitted by the terminal apparatus. The base station apparatus can notify the terminal apparatus of SRS spatial relation information (SRS-SpatialRelationInfo). In a case that the SRS spatial relation information indicates a prescribed signal (value, state), the terminal apparatus can transmit the SRS by using beamforming associated with the prescribed signal. For example, in a case that the SRS spatial relation information indicates a synchronization signal (SSB and PBCH), the terminal apparatus can transmit the SRS using the receive beamforming used in receiving the synchronization signal. Similarly, the base station apparatus can notify the terminal apparatus of the spatial relation information for other signals transmitted by the terminal apparatus (e.g., PUCCH/PUSCH/RS/RACH or the like), and other signals received by the terminal apparatus (e.g., PDCCH/PDSCH/RS). In other words, the base station apparatus can notify the terminal apparatus of the spatial relation information of a first signal and a second signal. In a case that the terminal apparatus receives the spatial relation information of the first signal and the second signal, and recognizes that the spatial relation is assured between the first signal and the second signal, the terminal apparatus can transmit the second signal (or receive the second signal) by using the reception parameter for receiving the first signal (or the transmission parameter for transmitting the first signal).

The QCL includes at least four types as follows, which are different in parameters to be considered to be the same. The base station apparatus and the terminal apparatus can configure any one QCL type or multiple QCL types at the same time among the following types between the antenna ports (or the signals associated with the antenna ports).

QCL type A: Doppler shift, Doppler spread, average delay, delay spread

QCL type B: Doppler shift, Doppler spread

QCL type C: Doppler shift, average delay

QCL type D: Spatial Rx

In a case that a PDSCH resource is scheduled using a downlink assignment, the terminal apparatus can configure a receive beamforming for receiving the PDSCH. At this time, the terminal apparatus can acquire information associated with the receive beamforming from the DCI in which the downlink assignment is described. For example, the terminal apparatus can acquire a transmission configuration indication (TCI) from the DCI. The TCI indicates information associated with the QCL related to the antenna port from which the PDSCH is transmitted. The terminal apparatus can configure the receive beamforming for receiving the PDSCH (or the DMRS associated with the PDSCH) by reading the TCI. For example, in a case that the TCI indicates a configuration that the SSB and the DMRS associated with the PDSCH are QCL for the reception parameter, the terminal apparatus can use the receive beam used in receiving the SSB having the index fed back to the base station apparatus in order to receive the PDSCH. Note that, in a case that the terminal apparatus cannot acquire the DCI in time (in a case that a value of a scheduling offset indicating a time difference between the scheduling information and the PDSCH is less than a prescribed value) before starting receiving the PDSCH (before a frame including the PDSCH is received by the terminal apparatus), the terminal apparatus may receive the PDSCH in accordance with TCI default that is a default configuration. Note that TCI-default is one of eight configured TCIs. The terminal apparatus can configure the receive beamforming, based on the configuration of TCI default in the case of receiving the PDCCH.

In order to determine a preferable transmit beam of the base station apparatus, a codebook is used in which candidates of a prescribed precoding (beamforming) matrix (vector) are defined. The base station apparatus transmits the CSI-RS, and the terminal apparatus determines a preferable precoding (beamforming) matrix from among the codebooks to report the matrix as a PMI to the base station apparatus. This allows the base station apparatus to recognize a transmit beam preferable for the terminal apparatus. Note that the codebook includes a precoding (beamforming) matrix that combines the antenna port and a precoding (beamforming) matrix that selects the antenna port. In a case that a codebook for selecting the antenna port is used, the base station apparatus can use a different transmit beam direction for each antenna port. Accordingly, in a case that the terminal apparatus reports an antenna port preferable as the PMI, the base station apparatus can recognize a preferable transmit beam direction. Note that the preferable receive beam of the terminal apparatus may be in the receive beam direction associated with the CRI, or a preferable receive beam direction may be again determined. In the case that a codebook for selecting the antenna port is used and that the preferable receive beam direction of the terminal apparatus is the receive beam direction associated with the CRI, the receive beam direction for receiving the CSI-RS is desirably received in the receive beam direction associated with the CRI. Note that even in a case that the receive beam direction associated with the CRI is used, the terminal apparatus can associate the PMI with the receive beam direction. Also, in the case that a codebook for selecting the antenna port is used, each antenna port may be transmitted from a different base station apparatus (cell). In this case, in a case that the terminal apparatus reports the PMI, the base station apparatus can recognize with which base station apparatus (cell) the communication quality is preferable. Note that in this case, the antenna port of the different base station apparatus (cell) can be assumed not to be QCL.

The terminal apparatus according to the present embodiment notifies the base station apparatus of multiple PMIs. The terminal apparatus according to the present embodiment can notify the base station apparatus of a PMI 1 serving as the first PMI and a PMI 2 serving as the second PMI.

The PMI 1 can be further a PMI 11 serving as an 11th PMI, a PMI 12 serving as a 12th PMI, a PMI 13 serving as a 13th PMI, and a PMI 14 serving as a 14th PMI.

The PMI 11 can further include q1 (a 111th PMI, PMI 111) that is an element for a first dimension, and q2 (a 112th PMI, PMI 112) that is an element for a second dimension. q1 can indicate an orthogonal matrix to which a vector v in the first dimension refers. The orthogonal matrix to which v refers is a DFT matrix given by the number N1 of CSI-RS ports in the first dimension included in the base station apparatus, and the base station apparatus can oversample the DFT matrix a certain number of times, the certain number being an oversampling number O1 with respect to the first dimension. This means that there are only O1 orthogonal matrices referred to by v, and thus, q1 is an indicator indicating the orthogonal matrix to which v refers among O1 orthogonal matrices. On the other hand, q2 is an indicator for the orthogonal matrix to which a vector u in the second dimension refers. The base station apparatus can oversample the DFT matrix given by the number N2 of CSI-RS ports in the second dimension a certain number of times, the certain number being an oversampling number O2 with respect to the second dimension. q2 is an indicator indicating the orthogonal matrix to which v refers among O2 orthogonal matrices. Note that in a case that the terminal apparatus performs feedback by assuming multiple layers, the orthogonal matrix indicated by the PMI 11 can be common between the layers. Note that the terminal apparatus according to the present embodiment can also perform notification of the PMI 11 for each layer.

The PMI 12 can be an indicator indicating at least one of multiple vectors included in a matrix selected by the PMI 11. The terminal apparatus can notify the base station apparatus of a vector given by a Kronecker product of a vector v in the first dimension and vector u in the second dimension. Since u and v are vectors selected from the DFT matrices having size N1 and size N2, respectively, the number of candidates of the vectors given by the Kronecker product of v and u is N1×N2. Furthermore, the terminal apparatus according to the present embodiment can feed back multiple vectors given by the Kronecker product of v and u to the base station apparatus. The number of vectors that can be fed back by the terminal apparatus is configured by the base station apparatus with L1 (L1, first value) indicating the number of first vectors. L1 can be notified to the terminal apparatus through higher layer signaling. Thus, the number of candidates of a combination of vectors fed back by the terminal apparatus to the base station apparatus is C (N1N1, L) where C(x, y) is a combination function indicating the number of combinations in a case that y pieces are selected from a population x. The PMI 12 can be an indicator indicating any one of C(N1N1, L) candidates of the combination of vectors. Note that the base station apparatus according to the present embodiment can include a polarization antenna, and a vector selected by the PMI 12 may be common. In addition, similar to the PMI 11, the terminal apparatus can also perform notification of the PMI 12 which is common between the layers. The terminal apparatus can perform notification of the PMI 12 individually between the layers.

The base station apparatus can configure the value of L1, based on the number of CSI-RS ports. As described later, the base station apparatus can also configure the value of L1 based on other information than the number of CSI-RS ports.

The PMI 13 can be an indicator indicating the strongest vector for the terminal apparatus, among L1 vectors notified by using the PMI 12. In a case that the base station apparatus includes the polarization antenna, the PMI 13 is the indicator indicating the strongest vector among 2×L1 vectors, including those between polarized waves. The terminal apparatus can notify the base station apparatus of the PMI 13 for each layer. The terminal apparatus according to the present embodiment can select one layer to perform notification of the strongest vector in the layer. In this case, the terminal apparatus can also notify the base station apparatus of the selected layer. The terminal apparatus can always perform notification of the strongest vector in the layer 1.

The PMI 14 is an indicator indicating an amplitude coefficient by which L1 vectors indicated by the PMI 12 can be multiplied. Note that the PMI 14 can also calculate the amplitude coefficient for each polarized wave, and in this case, the PMI 14 is an indicator indicating the amplitude coefficient by which (2×L1) vectors are multiplied.

The amplitude coefficient can be a value obtained by dividing a value between 0 and 1 with a prescribed granularity. For example, the terminal apparatus according to the present embodiment can notify the base station apparatus of any of 0, $64^{-1/2}$, $32^{-1/2}$, $16^{-1/2}$, $8^{-1/2}$, $4^{-1/2}$, $2^{1/2}$, and 1 as the amplitude coefficient for (2×L1) vectors indicated by the PMI 12, by using 3-bit information. The terminal apparatus can perform notification of the PMI 14 for each layer. The terminal apparatus according to the present embodiment can perform notification of the PMI 14 as a common value between the layers. The PMI 14 can include (2L−1) elements ($k^{(1)}_0$ (14(0)th PMI, PMI 14(0)), $k^{(1)}_1$ (14(1)th PMI, PMI 14(1)), . . . , $k^{(1)}_{2L-1}$ (14(2L−1)th PMI, PMI 14(2L−1)) indicating the amplitude coefficient of each vector indicated by the PMI 12. Also, each element can be defined for each layer.

A PMI 21 can indicate a phase coefficient for (2×L1) vectors indicated by the PMI 12. The phase coefficient can be an angle obtained by dividing an angle of 3600 with a prescribed granularity. For example, in a case that the 360° is divided into four segments, the terminal apparatus can notify the base station apparatus of any one of the phase coefficients indicating four angles of 0°, 90°, 180°, and 270° as the phase coefficient. The base station apparatus can notify the terminal apparatus of a NPSK as a value indicating the granularity of the phase coefficient. The base station apparatus can perform notification of any one of 2, 4, and 8 as the NPSK. The terminal apparatus can notify the base station apparatus of the PMI 21 for each layer. The terminal apparatus can notify the base station apparatus of the PMI 21 as a common value between the layers.

A PMI 22 can indicate an amplitude coefficient for (2×L1) vectors indicated by the PMI 12. Although the PMI 14 can also indicate an amplitude coefficient, the PMI 22 can indicate an amplitude coefficient for each sub-band. Thus, in a case that the terminal apparatus is requested to feed back the CSI for each sub-band from the base station apparatus, the terminal apparatus can feed back the PMI 22. The terminal apparatus can notify the base station apparatus of the PMI 22 for each layer. The terminal apparatus can notify the base station apparatus of the PMI 22 as a common value between the layers. The PMI 22 can include (2L−1) elements ($k^{(2)}_0$ (22(0)th PMI, PMI 22(0)), $k^{(2)}_1$ (22(1)th PMI, PMI 22(1)), . . . , $k^1_{2L-1}$ (22(2L−1)th PMI, PMI 22(2L−1)) indicating the amplitude coefficient of each vector indicated by the PMI 12. Each element included in the PMI 22 can be defined for each layer.

The terminal apparatus according to the present embodiment can notify the base station apparatus of a rank indicator (RI) indicating the desired number of layers for the terminal apparatus as the CSI. The terminal apparatus according to the present embodiment can change the PMI feedback, based on the value of RI notified to the base station apparatus.

The terminal apparatus performs notification of the RI/CQI/PMI preferable for the terminal apparatus itself, based on the reference signal such as NZP-CSI-RS. In a case that the terminal apparatus feeds back the RI satisfying RI>1 to the base station apparatus, the terminal apparatus feeds back the PMI corresponding to the number of RIs to the base station apparatus. Note that in the case of a configuration in which the PMI is not fed back, the PMI may not be fed back even in the case of RI>1. The feedback of RI satisfying RI>1 to the base station apparatus by the terminal apparatus indicates that the propagation environment is an environment in which high throughput can be expected, but at the same time, it means that the overhead related to PMI or CQI feedback may increase.

Thus, the base station apparatus and the terminal apparatus according to the present embodiment can control information related to feedback, based on the RI fed back by the terminal apparatus.

The base station apparatus according to the present embodiment can limit the number of ranks considered by the terminal apparatus in feeding back, with respect to the terminal apparatus. The base station apparatus can limit the number of ranks considered by the terminal apparatus through higher layer signaling (for example, typeII-RI■ Restriction (hereinafter, referred to as RI restriction, RI restriction information)). On the other hand, the base station apparatus can notify the terminal apparatus of L1 through higher layer signaling such as RRC.

Thus, in a case that the codebook configuration indicates the type 2 codebook, the base station apparatus according to the present embodiment can configure the value of L1 by the upper limit of the number of ranks considered by the terminal apparatus. In other words, depending on whether the number of ranks considered by the terminal apparatus exceeds a prescribed value, the upper limit of the value of L1 that the base station apparatus can notify changes. For example, in a case that the base station apparatus configures the upper limit of the number of ranks considered by the terminal apparatus as 2 through higher layer signaling (e.g., a codebook configuration), the base station apparatus can configure the upper limit of the value of L1 as 4. In a case that the base station apparatus configures the upper limit of the number of ranks considered by the terminal apparatus as 4 through higher layer signaling (a codebook configuration), the base station apparatus can configure the upper limit of the value of L1 as 2.

The terminal apparatus can acquire (determine) the value of L1 through higher layer signaling from the base station apparatus. The terminal apparatus according to the present embodiment can read the value of L1 depending on the value of the RI to be fed back. That is, based on whether or not the value of the RI to be fed back exceeds a prescribed value, the terminal apparatus can determine whether the value of considered L1 for use is the value as it is notified by the base station apparatus, or a value smaller than the value notified by the base station apparatus (second value of L, second value). For example, consider a case that the terminal apparatus is configured with the value of L1 as 4 by the base station apparatus. Then, in a case that the prescribe value is 2, the terminal apparatus can calculate a value of another feedback with reference to the value of L1 in a case of feeding back a value as the RI satisfying RI<3, and the terminal apparatus can calculate a value of another feedback as the second value of L (i.e., a value smaller than the value of L1 notified by the base station apparatus) in a case of feeding back a value as the RI satisfying RI>2.

Whether the scheme for limiting the value of L depending on the value of the RI described above is configured can be selected depending on the maximum value of the RI or the maximum value of the value of L1. Hereinafter, this can similarly apply to any of the schemes described in the present embodiment.

The terminal apparatus can notify the base station apparatus of the information referred to by the terminal apparatus by feeding back the PMI 11. For example, a matrix including multiple vectors can be notified to the base station apparatus by the PMI 11. The base station apparatus can limit the information referred to by the PMI 11 through higher layer signaling. For example, in a case that there are four patterns of candidates of the PMI 111 included in the PMI 11 (i.e., candidates of a matrix), the base station apparatus can notify, by a bitmap, the terminal apparatus of a candidate which may not be considered among four patterns.

The base station apparatus according to the present embodiment can further limit the information itself notified by the PMI 11. For example, in a case that the PMI 11 indicates a matrix including multiple vectors, the base station apparatus can notify, by the bitmap, of the candidate which may not be considered by the terminal apparatus among the multiple vectors included in the matrix, through higher layer signaling (or a control signal such as DCI). For example, in a case that the information indicated by the PMI 11 indicates four vectors, the base station apparatus can notify, by the bitmap, the terminal apparatus of a candidate of the vector which may not be considered among those four vectors. Note that, in a case that a vector which may not be considered by the terminal apparatus occurs, it goes without saying that the amount of information fed back by the terminal apparatus may be reduced based on the vector occurrence.

Note that whether or not the scheme for limiting the amount of information of the PMI 11 described above is configured may be determined depending on the value of RI fed back by the terminal apparatus or the value of the upper limit of the RI possible to be fed back to the terminal apparatus by the base station apparatus, or the relevant scheme may be configured for each RI. For example, in a case that the terminal apparatus is configured with the above limitation related to the PMI 11 by the base station apparatus, the terminal apparatus can feed back the PMI 11 in consideration of the above information amount limitation in a case that the value of the RI notified by the terminal apparatus exceeds a prescribed value (e.g., 2). In a case that the base station apparatus configures the RI restriction, the terminal apparatus can feed back the PMI 11 in consider-ation of the above information amount limitation in a case that the maximum value of the RI configured by the RI restriction exceeds a prescribed value.

The base station apparatus can also limit the candidates of the PMI 14 through higher layer signaling. The PMI 14 can indicate a coefficient (amplitude coefficient, amplitude weight) that is configured for each vector selected by the PMI 12, and the base station apparatus can configure the maximum value of the coefficient through higher layer signaling.

The terminal apparatus according to the present embodiment can change the maximum value of the coefficient depending on the value of the RI to be notified. For example, in a case that the maximum value of the coefficient is configured to be 1 through higher layer signaling from the base station apparatus, the terminal apparatus can calculate the PMI 14 with the maximum value of the coefficient being a value smaller than 1 (e.g., $2^{-(1/2)}$) and feedback to the base station apparatus in a case that the value of the RI to be notified exceeds a prescribed value.

Furthermore, the base station apparatus can limit a candidate value of an amplitude coefficient that can be fed back by the terminal apparatus, rather than limiting the maximum value of the amplitude coefficient. For example, in a case that eight candidates of the amplitude coefficient that can be fed back by the terminal apparatus are configured, the base station apparatus can limit the candidate value of the amplitude coefficient considered by the terminal apparatus by an 8-bit bitmap.

Candidates of the phase coefficient fed back by the terminal apparatus by way of the PMI 21 are determined by $N_{PSK}$ notified by the base station apparatus. The base station apparatus can consider 12, 4, 81 as the candidates of $N_{PSK}$. Depending on the value of $N_{PSK}$, a phase difference (angle difference) between the candidate values of the phase coefficient fed back by the terminal apparatus changes, and the phase difference is $360°/N_{PSK}$.

The base station apparatus may limit the candidates of the phase coefficient that are considered in the PMI 21. The base station apparatus according to the present embodiment can limit the value of $N_{PSK}$ in a case that the upper limit of the value of the RI considered by the terminal apparatus exceeds a prescribed value, by the RI restriction. For example, in a case that the RI restriction is a value exceeding 2, the base station apparatus can configure the value of $N_{PSK}$ to be 4 or less. In a case that the value of the RI to be fed back exceeds a prescribed value, the terminal apparatus can change the value of $N_{PSK}$ to be considered. For example, in a case that the value of $N_{PSK}$ notified by the base station apparatus through the RRC is 8, in a case that the value of the RI fed back by the terminal apparatus is a value (e.g., 3) exceeding a prescribed value (e.g., 2), the terminal apparatus can change the value of $N_{PSK}$ to 4 (i.e., a value smaller than the value notified through the RRC), and calculate and feed back the PMI 21.

The base station apparatus may limit, by a bitmap, the candidates of the phase coefficient that are considered in the PMI 21. For example, in a case that the base station apparatus configures $N_{PSK}=8$, the phase coefficient considered by the terminal apparatus in the PMI 21 can also be limited by the 8-bit bitmap.

In addition, a sub-band feeding back the phase coefficient may be limited. For example, the base station apparatus can configure a frequency density for feeding back the phase coefficient through higher layer signaling (e.g., a codebook configuration). For example, the frequency density is 1, 2, or 3. In a case that the frequency density is 1, the terminal apparatus feeds back the phase coefficient in all sub-bands. In a case that the frequency density is 2, the terminal apparatus feeds back the phase coefficient in a ratio of one to two sub-bands. In a case that the frequency density is 3, the terminal apparatus feeds back the phase coefficient in a ratio of one to three sub-bands. Thus, in a case that the fed-back sub-bands decreases due to the frequency density, the amount of feedback information is reduced.

The terminal apparatus can perform notification, by the PMI 22, of the amplitude coefficient for each sub-band (also referred to as a sub-band amplitude coefficient). However, because of the feedback for each sub-band, the overhead related to this feedback is extremely large. As such, the base station apparatus according to the present embodiment can configure whether to permit the feedback for each sub-ban, depending on the value of the RI notified by the terminal apparatus. Specifically, the base station apparatus can permit the terminal apparatus to notify the amplitude coefficient for each sub-band only in a case that the value of the RI notified by the terminal apparatus is less than or equal to a prescribed value.

In addition, a sub-band feeding back the sub-band amplitude coefficient may be limited. For example, the base station apparatus can configure a frequency density for feeding back the sub-band amplitude coefficient through higher layer signaling (e.g., a codebook configuration). For example, the frequency density is 1, 2, or 3. In a case that the frequency density is 1, the terminal apparatus feeds back the amplitude coefficient in all sub-bands. In a case that the frequency density is 2, the terminal apparatus feeds back the amplitude coefficient in a ratio of one to two sub-bands. In a case that the frequency density is 3, the terminal apparatus feeds back the amplitude coefficient in a ratio of one to three sub-bands. Thus, in a case that the fed-back sub-bands decreases due to the frequency density, the amount of feedback information is reduced. Note that the above-described frequency densities for the phase coefficient and the sub-band amplitude coefficient may be the same or different. In addition, the frequency density for the sub-band amplitude coefficient is used in a case that the sub-band amplitude coefficient is ON in higher layer signaling (e.g., the codebook configuration). In a case that the sub-band amplitude coefficient is OFF, no amplitude coefficient is considered for all sub-bands.

The amplitude coefficient (wide band amplitude coefficient or sub-band amplitude coefficient) may be common between the spatial layers in order to reduce the amount of information. For example, in a case that the base station apparatus configures information that the amplitude coefficient is common between the spatial layers through higher layer signaling (e.g., a codebook configuration), the terminal apparatus reports one amplitude coefficient in one CSI report (including the CSI part 1 and the CSI part 2).

Note that the aforementioned scheme for reducing the amount of information can be basically configured by the base station apparatus semi-statically through higher layer signaling, or can be predetermined in advance with the terminal apparatus, that is, fixedly configured. The base station apparatus according to the present embodiment can dynamically notify the terminal apparatus of information related to the scheme for reducing the amount of information.

The base station apparatus according to the present embodiment can describe the information related to the scheme for reducing the amount of information in a trigger requesting the terminal apparatus to feed back the CSI. Specifically, the information related to the scheme for reducing the amount of information can be described in the DCI serving as a trigger requesting the CSI feedback. In addition, the base station apparatus can configure multiple schemes for reducing the amount of information in advance for the terminal apparatus, and describe, in the DCI serving as a trigger requesting the CSI feedback, which of the multiple schemes for reducing the amount of information configured in advance is considered in the related CSI feedback.

The base station apparatus according to the present embodiment can notify the terminal apparatus of an element requested in the CSI feedback. For example, the base station apparatus can notify the terminal apparatus of information indicating which of the PMIs including the first PMI and the second PMI is to be included in the CSI feedback, by way of the DCI or through higher layer signaling.

Note that, the base station apparatus can configure the aforementioned scheme for reducing the amount of information to be common between layers, or for each layer, for the terminal apparatus. Specifically, in a case that the terminal apparatus performs the CSI feedback with RI=3, the scheme for reducing the amount of information may be configured to be not performed for the PMI corresponding to the layer 1 and the layer 2, and to be performed for the PMI corresponding to the layer 3. The base station apparatus can configure, for the terminal apparatus, whether or not the scheme for reducing the amount of information is configured for each layer, and can notify the terminal apparatus of the maximum number of layers to initiate consideration of the scheme for reducing the amount of information. In a case that the maximum number of layers to initiate consideration of the scheme for reducing the amount of information is configured to be 3, for example, the terminal apparatus may be configured to not perform the scheme for reducing the amount of information for the PMI corresponding to the layer 1 and the layer 2, and to perform the scheme for reducing the amount of information for the PMI corresponding to the layer 3.

The base station apparatus can notify the terminal apparatus of L1. Since a large value of L1 means an increase in the number of vectors that can be combined, the accurate CSI feedback is possible. However, the overhead related to the CSI feedback also increases, of course. Thus, the base station apparatus according to the present embodiment can configure the value of L1 to be associated with a value associated with another CSI feedback. For example, the base station apparatus can configure the value of L1 in accordance with the value of $O_1$ ($O_2$) considered in the PMI 111 (PMI 112) and the values of $N_1$ and $N_2$ considered in the PMI 12. For example, the base station apparatus can determine a maximum value of configurable L1, based on whether either or both of $N_1$ or $N^2$ exceed a prescribed value.

Note that since the number of candidates of the selectable vector in the PMI 12 is given by a product of $N_1$ and $N_2$, the value of L1 can be equal to or less than a value of the product of $N_1$ and $N_2$. The base station apparatus according to the present embodiment can also configure the value of L1 to be a value exceeding the value of the product of $N_1$ and $N_2$. This means that the terminal apparatus can select the same vector by the PMI 12. With such a configuration, even in a case that the number of candidate values of the amplitude coefficient fed back in the PMI 14 is small, the terminal apparatus can flexibly change the amplitude coefficient configurable for a vector that is selected in the PMI 12 (in simple consideration, the same vectors being selected and simply added corresponds to that the vector is multiplied by an amplitude coefficient of 2). Accordingly, even in a case that the amount of feedback related to the PMI 14 is reduced (for example, the candidate value is limited by the bitmap), the feedback accuracy decrease can be minimized.

2. Matters Common to all Embodiments

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or multiple aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The invention claimed is:

1. A base station apparatus configured to communicate with a terminal apparatus, the base station apparatus comprising:
    transmission circuitry configured to transmit a non-zero power (NZP) channel state information reference signal (CSI-RS) and radio resource control (RRC) signaling; and
    reception circuitry configured to receive channel state information (C SI) corresponding to the NZP CSI-RS, wherein
    the CSI includes at least a rank indicator (RI) and a precoding matrix indicator (PMI) that includes a plurality of indicators, the plurality of indicators indicating a plurality of vectors,
    a quantity of vectors of the plurality of vectors is determined based on a first value or a second value, the first value and the second value being indicated by the RRC signaling,
    the first value indicated by the RRC signaling in a case of a value of the RI being more than 2,
    the second value indicated by the RRC signaling in a case of a value of the RI being 2 or less, and
    the first value is equal to or smaller than the second value.

2. A terminal apparatus configured to communicate with a base station apparatus, the terminal apparatus comprising:
    reception circuitry configured to receive a non-zero power (NZP) channel state information reference signal (CSI-RS) and radio resource control (RRC) signaling; and
    transmission circuitry configured to transmit channel state information (CSI) corresponding to the NZP CSI-RS, wherein
    the CSI includes at least a rank indicator (RI) and a precoding matrix indicator (PMI) that includes a plurality of indicators, the plurality of indicators indicating a plurality of vectors,
    a quantity of vectors of the plurality of vectors is determined based on a first value or a second value, the first value and the second value being indicated by the RRC signaling,
    the first value indicated by the RRC signaling in a case of a value of the RI being more than 2,
    the second value indicated by the RRC signaling in a case of a value of the RI being 2 or less, and
    the first value is equal to or smaller than the second value.

3. A communication method for a base station apparatus configured to communicate with a terminal apparatus, the communication method comprising:
    transmitting a non-zero power (NZP) channel state information reference signal (CSI-RS) and radio resource control (RRC) signaling; and
    receiving channel state information (CSI) corresponding to the NZP CSI-RS, wherein the CSI includes at least a rank indicator (RI) and a precoding matrix indicator (PMI) that includes a plurality of indicators, the plurality of indicators indicating a plurality of vectors, a quantity of vectors of the plurality of vectors is determined based on a first value or a second value, the first value and the second value being indicated by the RRC signaling, the first value indicated by the RRC signaling in a case of a value of the RI being more than 2, the second value indicated by the RRC signaling in a case of a value of the RI being 2 or less, and the first value is equal to or smaller than the second value.

4. A communication method for a terminal apparatus configured to communicate with a base station apparatus, the communication method comprising:

receiving a non-zero power (NZP) channel state information reference signal (CSI-RS) and radio resource control (RRC) signaling; and transmitting channel state information (CSI) corresponding to the NZP CSI-RS, wherein the CSI includes at least a rank indicator (RI) and a precoding matrix indicator (PMI) that includes a plurality of indicators, the plurality of indicators indicating a plurality of vectors, a quantity of vectors of the plurality of vectors is determined based on a first value or a second value, the first value and the second value being indicated by the RRC signaling, the first value indicated by the RRC signaling in a case of a value of the RI being more than 2, the second value indicated by the RRC signaling in a case of a value of the RI being 2 or less, and the first value is equal to or smaller than the second value.

* * * * *